(12) United States Patent  
Kitaguchi et al.

(10) Patent No.: US 7,001,024 B2
(45) Date of Patent: Feb. 21, 2006

(54) IMAGE INPUT APPARATUS USING PROJECTED LIGHT

(75) Inventors: Takashi Kitaguchi, Kanagawa (JP); Yasuhiro Sato, Kanagawa (JP); Tomofumi Kitazawa, Kanagawa (JP); Shin Aoki, Kanagawa (JP); Takefumi Hasegawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 702 days.

(21) Appl. No.: 10/073,969

(22) Filed: Feb. 14, 2002

(65) Prior Publication Data

US 2002/0113946 A1 Aug. 22, 2002

(30) Foreign Application Priority Data

Feb. 14, 2001 (JP) .............................. 2001-036333
Jun. 22, 2001 (JP) .............................. 2001-189910
Oct. 10, 2001 (JP) .............................. 2001-312986

(51) Int. Cl.
*G03B 21/00* (2006.01)
*G03B 21/26* (2006.01)
*G01C 11/12* (2006.01)
*H04N 7/18* (2006.01)
*G06K 9/36* (2006.01)

(52) U.S. Cl. .............................. 353/70; 353/28; 356/2; 356/147; 348/135; 382/285; 382/294

(58) Field of Classification Search ................. 353/70, 353/28, 122; 356/2, 147; 348/195, 135; 382/285, 294
See application file for complete search history.

(56) References Cited

U.S. PATENT DOCUMENTS 4,963,986 A * 10/1990 Fukuyama et al. ......... 348/347
5,339,173 A * 8/1994 Jinnai ......................... 358/471
5,719,969 A * 2/1998 Taguchi ...................... 382/311
5,805,272 A * 9/1998 Nozawa et al. ............... 355/25
5,940,128 A * 8/1999 Morimura ................ 348/240.3
6,065,839 A * 5/2000 Miyata et al. .............. 353/122
6,082,865 A * 7/2000 Yamazaki ................... 353/122
6,104,840 A   8/2000 Ejiri et al. .................. 382/284
6,300,975 B1 * 10/2001 Yamane ....................... 348/63
6,366,360 B1   4/2002 Ejiri et al. .................. 358/1.9

(Continued)

FOREIGN PATENT DOCUMENTS

JP      62-143557      6/1987

(Continued)

OTHER PUBLICATIONS

U.S. Appl. No. 10/073,969, filed Feb. 14, 2002, Kitaguchi et al.

(Continued)

*Primary Examiner*—David Gray
*Assistant Examiner*—Magda Cruz
(74) *Attorney, Agent, or Firm*—Oblon, Spivak, McClelland, Maier & Neustadt, P.C.

(57) ABSTRACT

The present invention provides an image input apparatus into which a three-dimensional image as well as a two-dimensional image can be easily input. This image input apparatus includes an image pick-up unit, a projector unit, and a mover unit. The projector unit projects a predetermined projection light pattern onto an image object, and the image pick-up unit picks up the projection image containing distortions of the projection light pattern. The relative position between the projector unit and the image pick-up unit is fixed. The mover unit moves the image pick-up unit relatively with the projector unit, so that the image pick-up unit can pick up a plurality of projection images at different image pick-up locations.

37 Claims, 23 Drawing Sheets

U.S. PATENT DOCUMENTS

2002/0113946 A1 8/2002 Kitaguchi et al.

FOREIGN PATENT DOCUMENTS

| JP | 6-82225 | 3/1994 |
|----|---------|--------|
| JP | 8-13088 | 2/1996 |
| JP | 09-161043 | 6/1997 |
| JP | 9-247362 | 9/1997 |
| JP | 2000-55636 | 2/2000 |
| JP | 3063099 | 7/2000 |
| JP | 2000-283752 | 10/2000 |

OTHER PUBLICATIONS

U.S. Appl. No. 10/743,092, filed Dec. 23, 2003, Suzuki et al.
U.S. Appl. No. 10/891,364, filed Jul. 15, 2004, Furuta et al.
U.S. Appl. No. 09/227,707, filed Jan. 8, 1999.
U.S. Appl. No. 09/004,151, filed Jan. 7, 1998.
U.S. Appl. No. 10/073,969, filed Feb. 14, 2002.

* cited by examiner

IMAGE INPUT APPARATUS USING PROJECTED LIGHT

BACKGROUND OF THE INVENTION

1. Field of the Invention

The present invention relates to an image input apparatus, and, more particularly, to an image input apparatus into which a three-dimensional image, as well as a two-dimensional image, can be easily input.

2. Description of the Related Art

In recent years, the processing power of personal computers has dramatically increased. As the processing of image data has become easier, a larger volume of image data is now used in business documents at offices. In view of this, image data now plays a very important role in document presentation.

With such a trend, there is an increasing demand for an easier image data processing technique that enables a person to obtain image data of a document or an object at hand.

Devices for obtaining image data include scanners and digital cameras. A scanner can take a high-resolution image of a paper sheet, but cannot take an image of a three-dimensional object or characters written on the three-dimensional object. Also, the input memory size of a scanner is limited. In addition to this, a scanner takes up a large space, and it is difficult for a person to carry a scanner around. On the other hand, a digital camera can solve the above problems of a scanner, but is relatively poor in resolution. To solve such a problem, there is a method of combining divisional images of an object picked up by a digital camera.

To perform a divisional image pick-up operation, however, a person has to go to great trouble in picking up many images of one object. Also, the image combining process does not necessarily lead to automatic combining of images with high precision. As a solution to this, Japanese Patent Publication No. 8-13088 suggests a method in which an imaging optical system and an image pick-up optical system are moved to pick up divisional images of an image object, and the divisional images are then combined to form a complete image. In this method, the imaging optical system is moved in two axial directions, and the image object is taken as divisional images to be combined into a high-resolution complete image.

Japanese Laid-Open Patent Application No. 9-161043 discloses a document image input apparatus that can obtain a high-precision document image. In this image input apparatus, a separator is detected so as to reduce the number of partial image pick-up operations and the number of image relative location measuring operations. The document image input apparatus is further equipped with a view-point control mechanism that enables automatic divisional image input and matching-up of divisional images. As shown in FIG. 1, the document image input apparatus has a camera 100 attached to a camera control mechanism 101 that can move the position of the camera 100 with respect to each document. With such a structure, divisional image input and matching-up process for divisional images can be easily performed.

Japanese Patent No. 3063099 discloses an apparatus for reading a double-page spread document, such as an opened book, with the read side facing upward. In this apparatus, a light emitting unit emits linear light onto a double-page spread document at a predetermined angle, and the lighted image is picked up so that the apparatus can detect the curvature of the double-page spread document. Based on the detection result, the curvature is corrected. Also, Japanese Laid-Open Patent Application No. 62-143557 discloses a technique for detecting the distance from a document surface, instead of the curvature, and then correcting for the curvature of the document.

In a general method of measuring a three-dimensional object, a predetermined pattern is projected onto an image object, and a trigonometrical survey is conducted based on the distortions of the projected pattern image. For instance, Japanese Laid-Open Patent Application No. 2000-55636 discloses a method in which a stroboscope is employed as a pattern projector unit so that an ordinary camera can be used in an image input apparatus.

However, none of the above conventional methods and apparatuses has a function for inputting three-dimensional information.

As the processing power of personal computers is becoming greater, the processing of image data containing three-dimensional information, as well as conventional image data, is becoming easier, and three-dimensional images seem to be more widely used at offices. Fur such business use, it is preferable to be able to obtain three-dimensional images of documents and three-dimensional objects, as well as two-dimensional images.

Conventionally, image objects are classified into three types of images consisting of document images, book images, and three-dimensional object images. Depending on the type of image, it is necessary to change image pick-up conditions such as magnification and light pattern projection. However, developing such a system entails complicated processes, and, therefore, neither an image input apparatus that can obtain all three types of images, nor any improvements on existing image input apparatuses to obtain all three types of images, has been suggested.

SUMMARY OF THE INVENTION

A general object of the present invention is to provide an image input apparatus in which the above disadvantages are eliminated.

A more specific object of the present invention is to provide an image input apparatus that can obtain a high-resolution image of a three-dimensional object through a divisional image pick-up process at low cost.

A further specific object of the present invention is to provide an image input apparatus that can obtain a high-resolution and high-quality image in a correct position through a "visual angle distortion" correction process when an image cannot be picked up in a correct position with respect to an image object, and, especially, when a visual angle distortion is found in an image of a flat object such as a document image.

Another specific object of the present invention is to provide an image input apparatus that can obtain high-resolution flat image information and three-dimensional image information on a desk through easy processes at low cost.

Still another specific object of the present invention is to provide an image input apparatus that can obtain images with enhanced resolution for detecting a three-dimensional object.

Yet another specific object of the present invention is to provide an image input apparatus that recognizes the location of an image object, and automatically determines whether the image object is a paper sheet or a three-dimensional object.

Still another specific object of the present invention is to provide an image input apparatus that can easily recognize an image pick-up area.

Yet another object of the present invention is to provide an image input apparatus that can obtain a high-quality image of a paper sheet without providing illumination, thereby reducing power consumption for light projection.

Still another specific object of the present invention is to provide an image input apparatus that can obtain images for producing a so-called "3-D image".

Yet another specific object of the present invention is to provide an image input apparatus that measures a three-dimensional configuration of an image object without the aid of another device such as a personal computer, and stores three-dimensional configuration data, instead of an image, thereby saving memory area.

Still another specific object of the present invention is to provide an image input apparatus that can directly distribute three-dimensional data without the aid of another device such as a personal computer.

Yet another specific object of the present invention is to provide an image input apparatus that can easily recognize the three-dimensional configuration of an image object seen from all directions.

Still another specific object of the present invention is to provide an image input apparatus that can perform an image pick-up operation in one of three image pick-up operation modes consisting of a paper image pick-up mode for picking up an image of a flat object such as a paper sheer, a book image pickup mode for picking up an image of a double-page spread object such as an opened book, and a three-dimensional image pick-up mode for picking up an image of a three-dimensional object.

Yet another specific object of the present invention is to provide an image input apparatus that sets an image pick-up resolution corresponding to an image pick-up operation mode selected from the three image pick-up operation modes, thereby setting more specific image pick-up conditions.

Still another specific object of the present invention is to provide an image input apparatus that automatically recognizes the type of image object, such as a paper sheet, a book, and a three-dimensional object, thereby automatically setting a suitable image pick-up operation mode.

Yet another specific object of the present invention is to provide an image input apparatus that can increase the number of image pixels of an input image for measuring a three-dimensional location.

Still another specific object of the present invention is to provide an image input apparatus that can obtain higher-precision three-dimensional object data.

Yet another specific object of the present invention is to provide an image input apparatus that can obtain three-dimensional data containing less noise, which is due to distortions caused by measurement errors.

The above objects of the present invention are achieved by an image input apparatus that includes: a projector unit for projecting image pickup light onto an image object; an image pick-up unit for picking up an image of the image object, onto which the projector unit projects the image pick-up light; a support unit for supporting the image pickup unit; and a mover unit for moving the image pickup unit relatively with the support unit. In this image input apparatus, the projector unit projects a predetermined projection light pattern onto the image object, and the image pick-up unit picks up a projection image containing distortions of the predetermined projection light pattern. The relative position between the projector unit and the image pick-up unit is always fixed. The mover unit causes movement of the image pick-up unit relative to the image object, so that the image pick-up unit can pick up a plurality of projection images at different image pick-up locations.

In the image input apparatus of the above structure, the relative position between the projector unit for projecting image pick-up light onto an image object and the image pick-up unit for picking up an image of the image object is fixed. The mover unit moves the image pick-up unit relatively with the support unit, so that the image pick-up unit can pick up a plurality of projection images at different image pick-up locations. The three-dimensional image of the image object can be picked up from the patterned light projected on the image object. The mover unit can be used for a divisional image pick-up operation for a patterned light projected image, as well as a divisional image pick-up operation for a regular image. Accordingly, a high-resolution three-dimensional image of the image object can be obtained through a divisional image pick-up operation at low cost.

In this type of image input apparatus, the relative position between the projector unit and the support unit is always fixed, and the mover unit moves the image pick-up unit so that the image pickup unit picks up the plurality of projection images at different image pick-up locations.

With such a structure, a high-resolution three-dimensional image of the image object can be obtained through a divisional image pick-up operation at low cost. Furthermore, with the position of the projector unit being known, even if a high-precision slit light pattern is projected, the projection angle of each ray can be determined. Thus, the resolution in measurement of a three-dimensional configuration can be increased.

In the image input apparatus in accordance with the present invention, the image pick-up unit may also pick up a non-projection image formed when the projector unit does not project light onto the image object.

In such a structure, a texture image can be obtained, and the texture image is mapped on a three-dimensional configuration. Thus, the image input apparatus can perform a three-dimensional image forming operation as well as a regular image forming operation. With this image input apparatus, a so-called "3-D image" can be produced.

The image input apparatus of the present invention may further include a location memory unit for storing image pick-up locations of the image pick-up unit. In this image input apparatus, a visual angle distortion of the image picked up by the image pick-up unit may be corrected in accordance with location data stored in the location memory unit.

In such a structure, even if there is a visual angle distortion in an image picked up at an incorrect image pick-up location, a visual angle distortion correcting operation can be performed so as to obtain an image at a correct location. This visual angle correcting operation is specially effective to correct a visual angle distortion caused in a document image. Thus, a high-quality image can be obtained with high resolution.

The image input apparatus of the present invention may further include a switch unit for switching an image pick-up operation mode between a first operation mode for picking up a flat image and a second operation mode for picking up a three-dimensional image.

With such a component, a suitable image pick-up operation mode can be selected depending on the type of image object (such as a flat object and a three-dimensional object), and the effectiveness of the apparatus can be enhanced.

Further, the image pick-up unit of the image input apparatus may perform a preliminary image pickup operation on an image pick-up area.

As a result, the location of the image object can be detected in advance, and the type of image object (three-dimensional or flat) can be recognized. Thus, a suitable image pick-up conditions can be automatically set in the apparatus prior to an image pick-up operation.

Also, the projector unit of the image input apparatus may project a projection light pattern for indicating an image pick-up area before the image pick-up unit performs an image pick-up operation on the image object.

In such a structure, a user can recognize the image pick-up area in advance, and thus avoid failing in an image pick-up operation.

When the image input apparatus of the present invention is in the first operation mode, the image pick-up unit performs an image pick-up operation without light projection from the projector unit. On the other hand, when the image input apparatus is in the second operation mode, the projector unit projects the predetermined projection light pattern onto the image object, so that the image pick-up unit picks up the projection image containing a visual angle distortion of the projection light pattern.

In such a structure, when the image object is a paper sheet that does not require light projection, the first operation mode is selected, and unnecessary light projection is avioded. Thus, electric power consumption can be reduced.

Further, in the second operation mode, before or after the image pick-up unit picks up the projection image, the image pick-up unit picks up a non-projection image formed when the projector unit does not project light onto the image object.

As a result, not only the measurements of a three-dimensional configuration but also image data for forming a 3-D image can be obtained.

The image input apparatus of the present invention may further include a three-dimensional configuration measuring unit for measuring the three-dimensional configuration of an image object in accordance with an image picked up by the image pickup unit.

With such a component, the three-dimensional configuration of an image object can be measured without the aid of a special computing device such as a personal computer. Also, as three-dimensional data are stored instead of image data itself, the required memory space can be made smaller.

The image input apparatus of the present invention may further include a three-dimensional image forming unit for forming a three-dimensional image in accordance with the image picked up by the image pick-up unit and the three-dimensional configuration of the image object obtained by the three-dimensional configuration measuring unit.

With such a component, 3-D image data can be directly distributed without the aid of a special computing device such as a personal computer.

The image input apparatus of the present invention may further include a visual angle distortion correcting unit for correcting a visual angle distortion of each picked up image. With such a structure, the image input apparatus can directly provide high-quality paper image data containing no distortions.

In the image input apparatus of the present invention, a support unit supporting the image object may be rotatable. With this rotatable support unit, the three-dimensional configuration information of the image object seen from all directions can be easily obtained.

The objects of the present invention are also achieved by an image input apparatus that includes: an image pick-up unit; a support unit for supporting the image pick-up unit; and a three-dimensional configuration measuring unit for measuring a three-dimensional configuration of an image object. This image input apparatus has three image pick-up modes consisting of a paper image pickup mode for picking up an image of a flat object such as paper, a book image pick-up mode for picking up an image of a double-page spread object such as an opened book, and a three-dimensional image pick-up mode for picking up an image of a three-dimensional object.

In this image input apparatus, the image pick-up unit may have a plurality of image pick-up resolution settings corresponding to the three image pick-up modes. As a result, more specific image pick-up conditions can be set in the image input apparatus.

This image input apparatus may further include: an image object determining unit for determining characteristic features of the image object in accordance with a measurement result obtained by the three-dimensional configuration measuring unit; and an automatic mode select unit for automatically selecting one of the three image pickup modes in accordance with a determined result from the image object determining unit.

With these components, there is no need for a user to take trouble to select an image pick-up operation mode, and the effectiveness of the apparatus can be increased.

Further, in the image input apparatus of the present invention, the mover unit moves the image pick-up unit by a very small distance, so that the image pick-up unit picks up a plurality of projection images at image pick-up locations that are only slightly shifted from one another.

In such a structure, sets of pixel data (three-dimensional measuring points) taken at image pick-up locations that are slightly shifted from one another on the image object can be obtained.

This image input apparatus may further include a composition unit for combining three-dimensional configuration data obtained in accordance with the plurality of projection images so as to generate combined three-dimensional configuration data. With such a component, more precise three-dimensional configuration data can be obtained.

DESCRIPTION OF THE PREFERRED EMBODIMENTS

The following is a description of embodiments of the present invention, with reference to the accompanying drawings.

Figure 1:
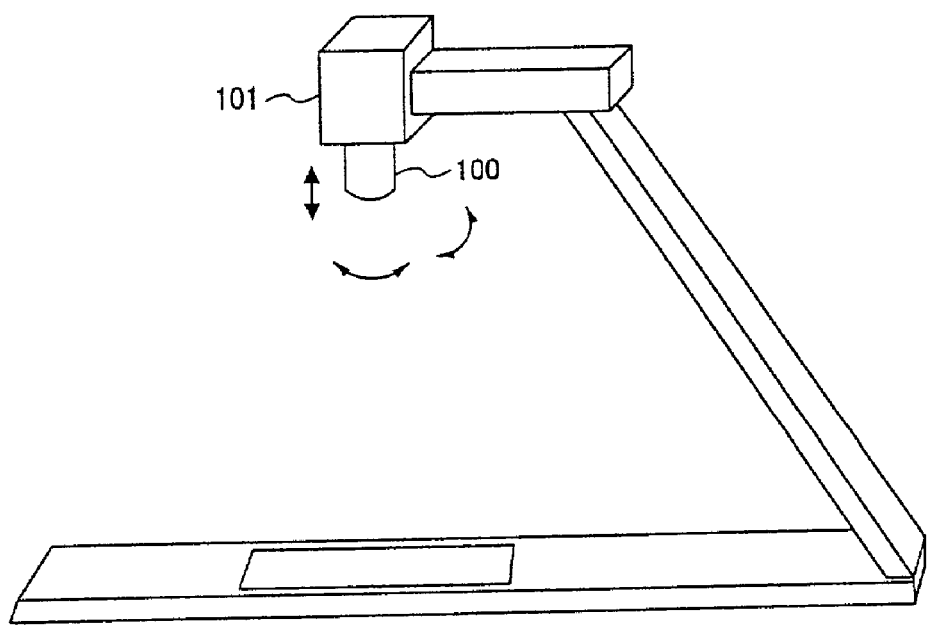
FIG. 1 is an external view of the structure of a conventional document image input apparatus.
Figure 2:
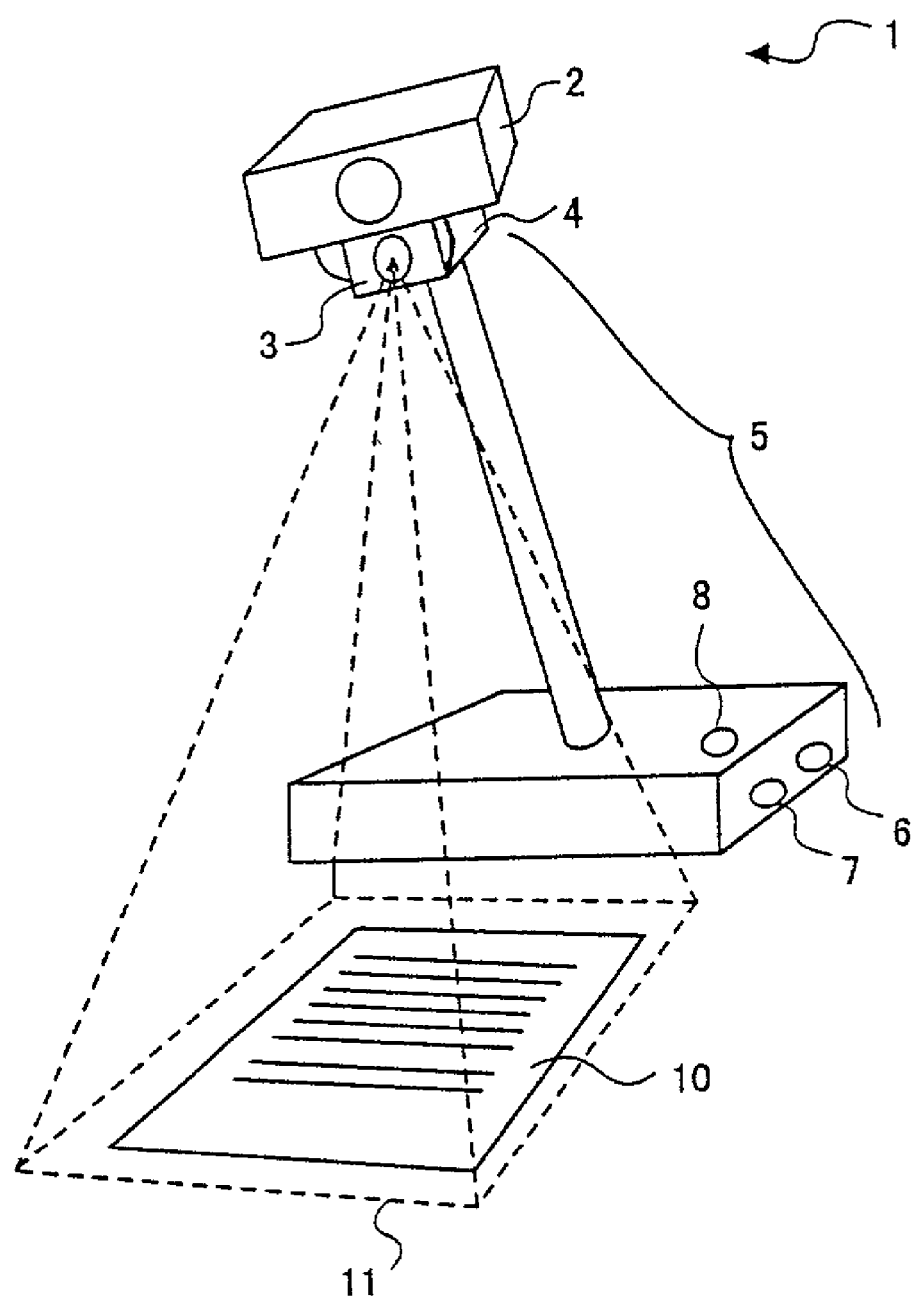
FIG. 2 is an external view of an image input apparatus in accordance with the first embodiment of the present invention.

FIGS. 2 through 6 illustrate a first embodiment of an image input apparatus in accordance with the present invention. FIG. 2 is an external view of the first embodiment of the image input apparatus in accordance with the present invention.

In FIG. 2, an image input apparatus 1 includes an image pick-up unit 2, a projector unit 3, a mover unit 4, a support unit 5, a projector switch 6, an image pick-up switch 7, and a select switch 8. The image pick-up unit 2 is supported by the support unit 5 via the mover unit 4.

When the image pick-up switch 7 is pressed, the image input apparatus 1 picks up an image of an image object 10 set on a flat surface, such as the top of a desk, on which the support unit 5 is placed.

The mover unit 4 horizontally moves the optical axis of the image pick-up unit 2, so that the image pick-up unit 2 can pick up divisional images of the image object 10. When performing a divisional image pick-up operation, the image pick-up unit 2 narrows the angle of view, so as to increase the resolution of images of the image object 10.

When the projector switch 6 is pressed, the projector unit 3 projects a projection light pattern 11 onto the image object 10.

The select switch 8 is used for selecting an operation mode between a first operation mode and a second operation mode for the image input apparatus 1. In the first operation mode, the image input apparatus 1 can pick up images from a flat object such as paper. In the second operation mode, the image input apparatus 1 can obtain 3-D (three-dimensional) information of a three-dimensional object.

When an image of the image object 10 is to be picked up, the projector switch 6 is pressed so that the projector unit 3 projects light onto the image pick-up area.

The projection light pattern 11 is preferably a rectangle, but may not have a definite shape, as long as the image pick-up area is clearly recognizable. With an auxiliary optical system that can enlarge or reduce the projection light pattern 11, the projector unit 3 can freely change the size of the projection area. By projecting light onto the image pick-up area, the projector unit 3 shows the position in which the image object 10 should be placed.

After the placement of the image object 10, the image pick-up switch 7 is pressed so that the image pick-up unit 2 picks up an image of the image object 10.

The light projection may automatically stop after a certain period of time or when the image pick-up switch 7 is pressed. Alternatively, the light projection may continue as lighting for image pick-up until the image pick-up operation is completed. Further, the light projection may temporarily stop when the image pick-up switch 7 is pressed, and resume when an image pick-up operation starts.

In an image pick-up operation in the first operation mode, the projector unit 3 does not project a 3-D measuring projection light pattern that will be described later. In an image pick-up operation in the second operation mode, the projector unit 3 projects the 3-D measuring projection light pattern. Alternatively, in the first operation mode, the projector unit 3 may project a projection light pattern as the lighting for image pick-up until the image pick-up operation is completed. The projection light pattern for lighting may be the same as the projection light pattern that indicates an image pick-up area. Also, the projection of the projection light pattern for lighting may continue from the indication of the image pick-up area until the end of the image pick-up operation, or may temporarily stop in between and resume at the start of the next image pick-up operation.

Prior to an image pick-up operation, a preliminary image pick-up operation may be performed to pick up an image of the entire image pick-up area. By such an operation, the image input apparatus 1 can automatically recognize the location of the image object 10, which is to be the image pick-up area in the main image pick-up operation.

The image object 10 is not restricted to the surface on which the support unit 5 is placed, but may also be on the front side surface of the desk, for instance. Also, the image object 10 may contain an interface with another device, such as a personal computer, for transmitting picked-up images.

Figure 3:
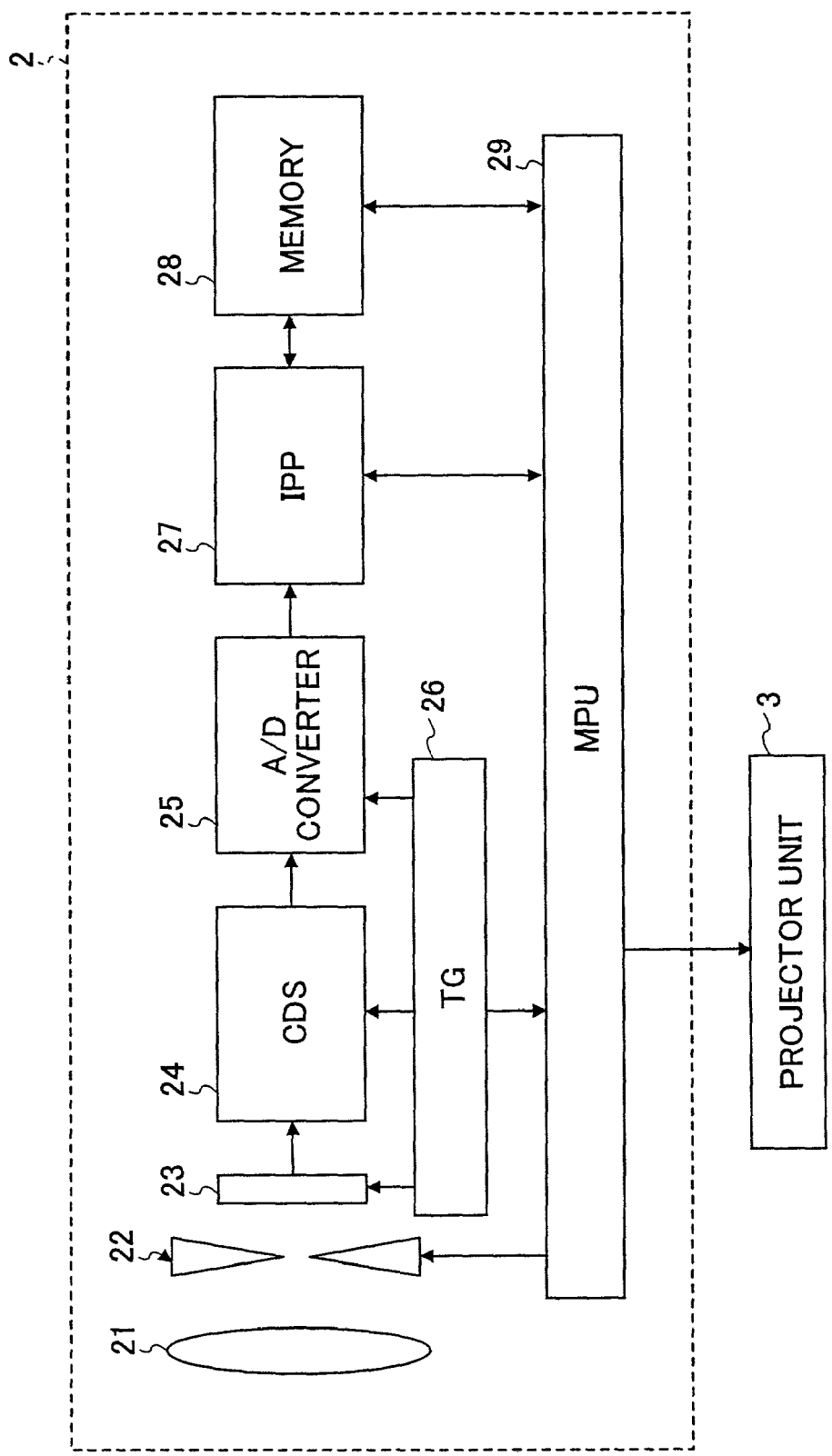
FIG. 3 shows the structure of the image pick-up unit of the image input apparatus shown in FIG. 2.

Referring now to FIG. 3, the image pick-up unit 2 includes a lens 21, a diaphragm mechanism 22, an image pick-up device 23, a correlation double sampling(CDS) circuit 24, an analog-to-digital(A/D) converter 25, a timing generator(TG) 26, an image preliminary processing(IPP) circuit 27, a memory 28, and an MPU(microprocessing unit) 29. An image of the image object 10 is formed on the image pick-up device 23 through the lens 21 and the diaphragm mechanism 22. An image signal transmitted from the image pick-up device 23 is subjected to sampling at the correlation double sampling circuit 24, and then converted to a digital signal by the A/D converter 25. The timing in this state is generated by the timing generator 26. The image signal is then subjected to image processing, such as aperture correction, and compression at the image preliminary processing circuit 27. The image signal processed in the above manner is stored in the memory 28. The operation of each unit is controlled by the MPU 29, which also controls-the projection timing of the projector unit 3.

Figure 4:
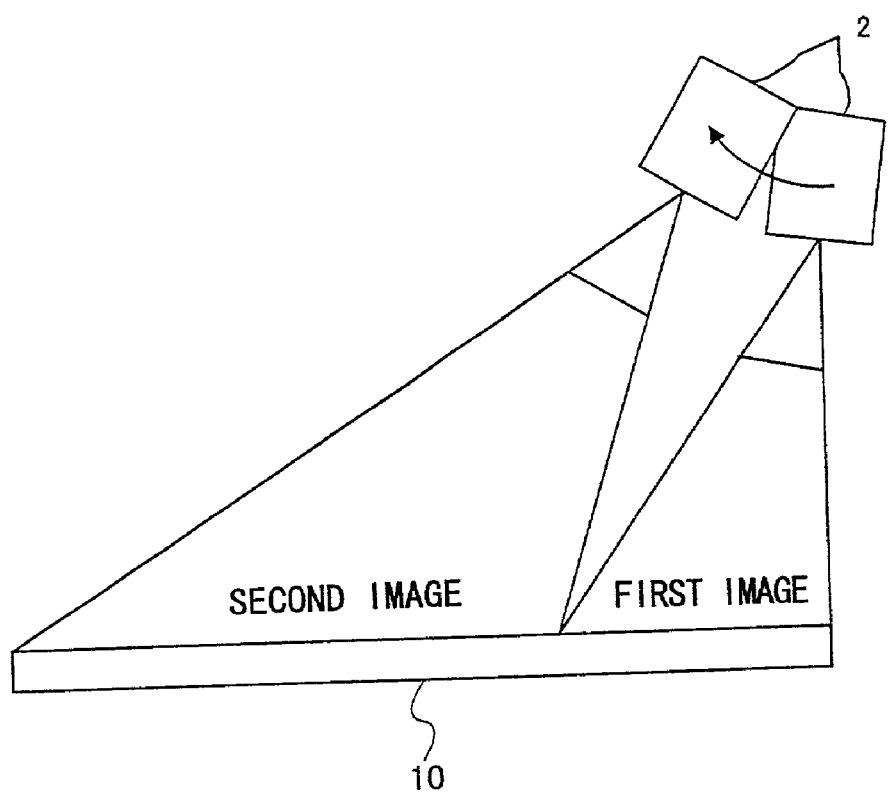
FIG. 4 illustrates a situation in which the field angle of the image pick-up unit is narrowed, and the image pick-up unit performs a divisional image pick-up operation so as to obtain a high-resolution image by the image input apparatus of FIG. 2.

When taking a high-resolution image of the image object 10 in the first operation mode, the angle of view of the image pick-up system should be narrowed. Referring now to FIG. 4, an image pick-up operation is performed at a plurality of positions, which is a divisional image pick-up operation. In such an operation, it is desirable that a complete image of the image object 10 be contained in the combined image of the divisional images obtained through the divisional image pick-up operation. To perform the divisional image pick-up operation, the image pick-up unit 2 is moved by the mover unit 4. In FIG. 4, a first image and a second image are picked up, and then combined to form one complete image. This composition process, however, requires an exceptionally large amount of operation resources. For this reason, the image may be transferred to an external apparatus such as a personal computer, and the composition process may then be carried out.

After the divisional image pick-up operation, the divisional images are combined. For ease of explanation, a case where two divisional images are combined is taken-for example. Referring to FIG. 4, the image object 10 is a flat object. Where the coordinates of a point in the first image and a point in the second image are $(u_1, v_1,)$ and $(u_2, v_2)$, respectively, the relationship between them can be expressed by the following equations:

[※1]Note: Need to insert equations 1–3

In the above equation (3), H represents a projection conversion matrix, which is fixed as long as the positional relationship between the two images stays the same. Accordingly, $h_1$ through $h_8$ can be calculated from the predetermined coordinates $(u_1, v_1)$ and $(u_2, v_2)$.

Using the above equations (1) and (2), the location of each point in the second image picked up by the image pick-up unit 2 in the position for picking up the first image can be calculated. Accordingly, with the first image being used as a reference image, the pixels of the second image can be mapped on the first image. Likewise, where there are three or more divisional images, a projection conversion matrix of the first image and an Nth (N being a whole number) image should be calculated in advance, so that the divisional images can be combined in the same manner as described above.

Figure 5:
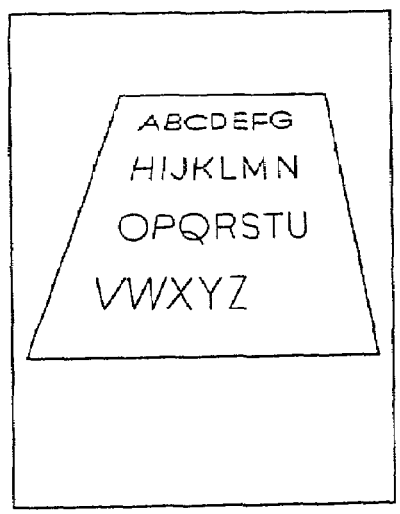
FIG. 5 illustrates a situation in which a trapezoidal deformation (a visual angle distortion) is caused in an image taken obliquely.
Figure 6:
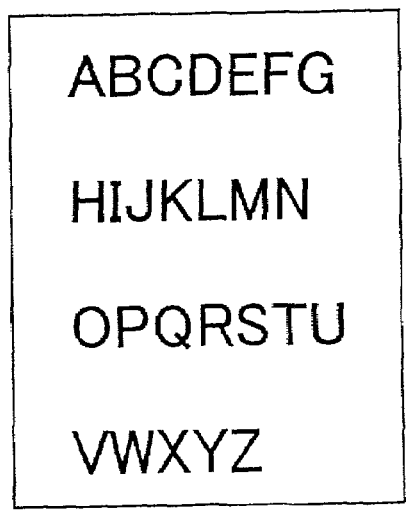
FIG. 6 illustrates a corrected image in which the trapezoidal deformation of FIG. 5 has been corrected.

Either when images are combined in the above manner or when an image object is taken in one image, there may be a trapezoidal deformation (a positional angle distortion) as shown in FIG. 5. Such a positional distortion needs to be corrected so as to generate an image taken in a correct position as shown in FIG. 6. To achieve this, the above method of the present invention can be applied. That is, a correct image taken in the correct position with respect to the image object 10 is used as a reference image, and a projection conversion matrix between the correct image and an image picked up obliquely is determined in advance. With this projection conversion matrix, each of the pixels actually taken can be rearranged.

This process may be carried out within the image input apparatus, or image information may be transferred to and processed in an external apparatus such as a personal computer.

Referring now to FIGS. 7 through 10, an operation in the second operation mode of the image input apparatus 1 of the first embodiment will be described below.

Figure 7:
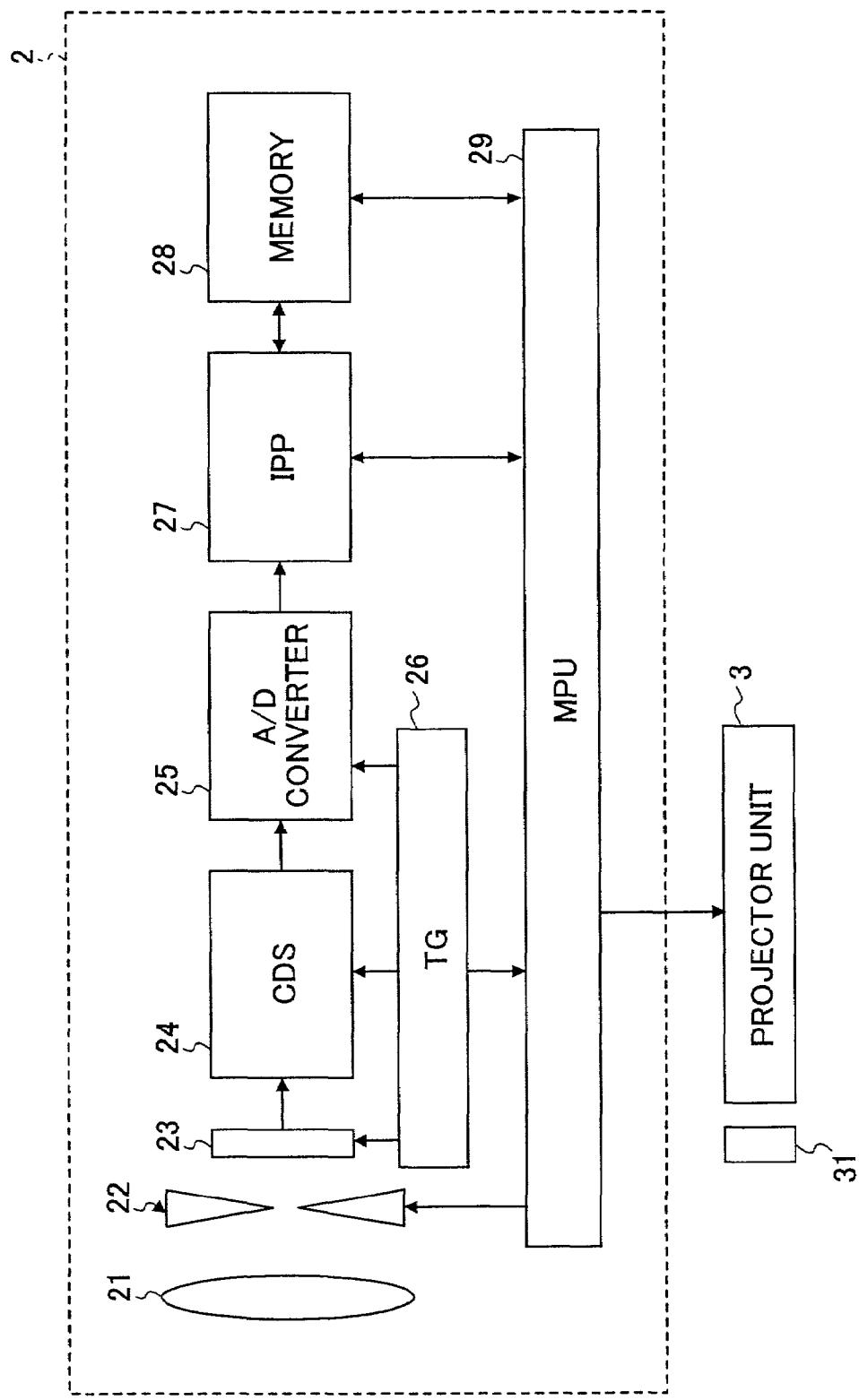
FIG. 7 is a block diagram of the image pickup unit and the projector unit of the image input apparatus of FIG. 2 in a second operating mode.

FIG. 7 is a block diagram of the image pickup unit 2 and the projector unit 3 of the image input apparatus 1 in the second operation mode.

As shown in FIG. 7, the projector unit 3 is provided with a filter 31. The projector unit 3 projects a predetermined patterned light, which may be a striped pattern 32 as shown in FIG. 8, but may be some other pattern.

Figure 8:
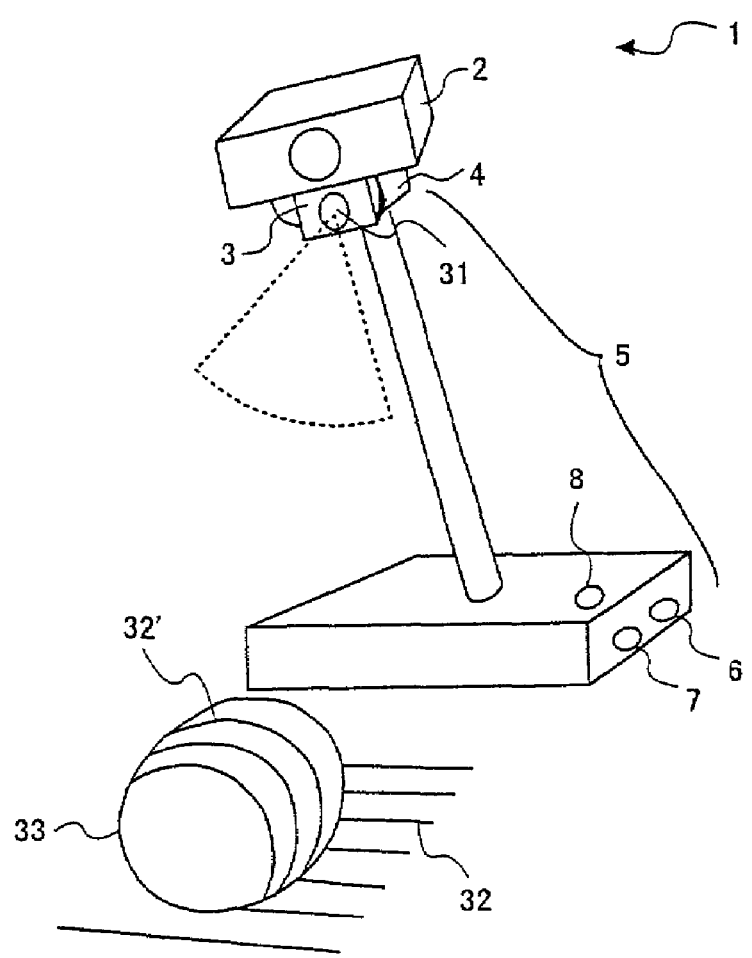
FIG. 8 is an external view of the image input apparatus in the second mode projecting stripe-patterned light (slit light) onto a three-dimensional object.

Referring to FIG. 8, the striped pattern 32 is projected onto an image object 33, and an image of the image object 33 is picked up by the image pick-up unit 2. As a result, a deformed patterned light 32' is obtained. Based on the deformation, the three-dimensional location of each point on the surface of the image object 33 can be detected through a trigonometrical survey.

Figure 9:
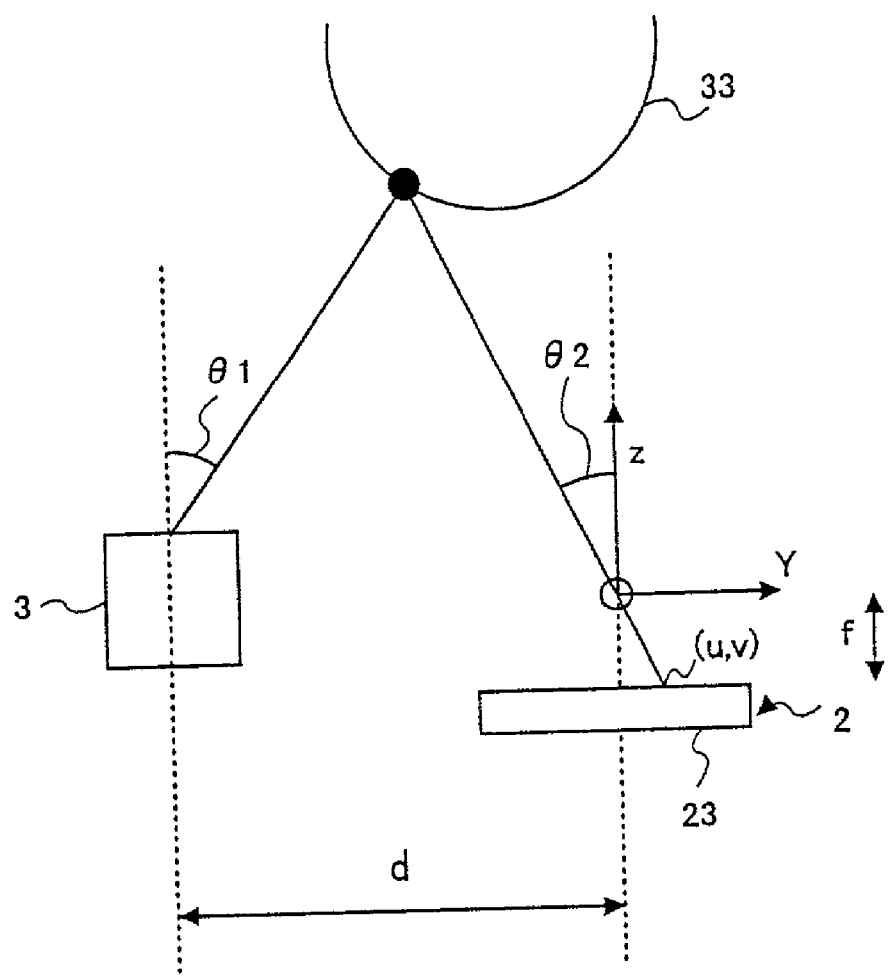
FIG. 9 illustrates the principles of three-dimensional configuration measurement in accordance with the first embodiment of the present invention, with reference to a correlative positional relationship between the projector unit and the three-dimensional object, and a correlative positional relationship between the projector unit and the image pick-up device of the image pick-up unit.
Figure 10:
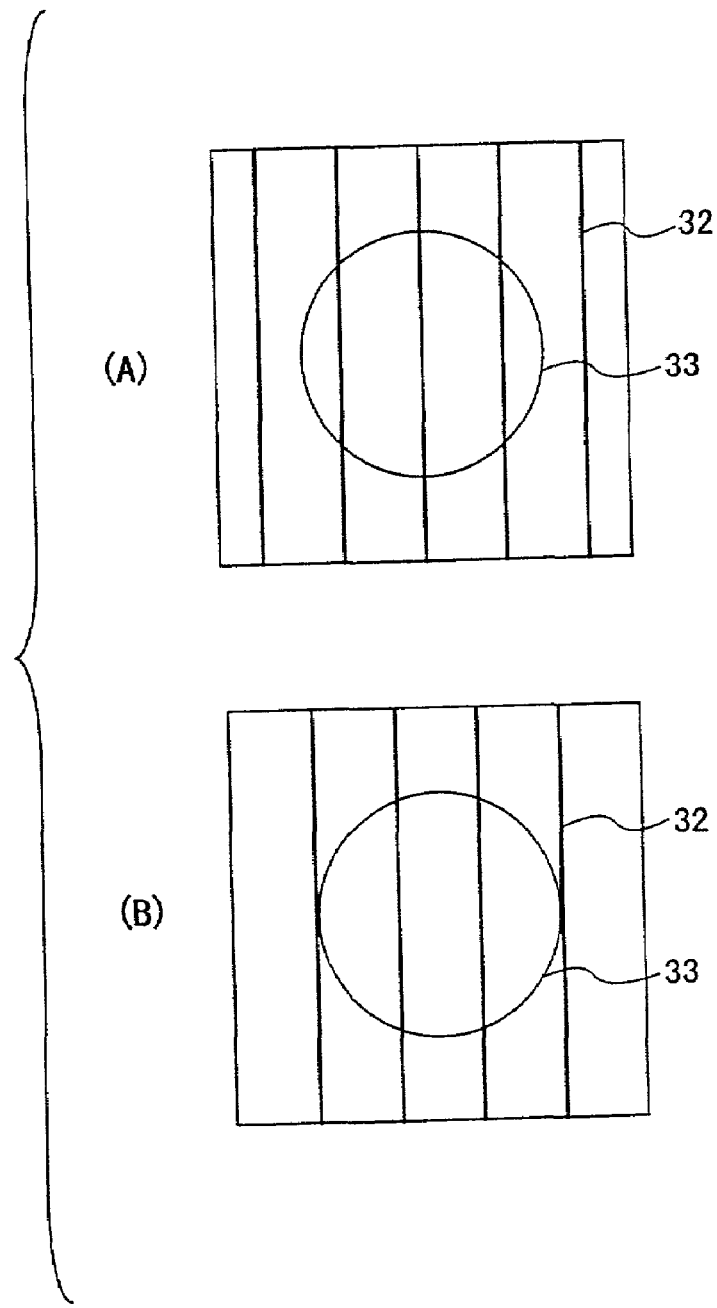
FIGS. 10A and 10B illustrate the features of a second embodiment of the image input apparatus in accordance with the present invention, by showing a situation where the stripe-patterned light is projected onto the image object (with the rays of slit light being shifted by a half pitch)

As shown in FIG. 9, the image of a part of the object lighted by a ray of the slit light of the patterned light projected from the projector unit 3 is formed on a point (u, v) on the image pick-up device 23 of the image pick-up unit 2. Here, to determine the coordinate system with the optical center of the image pick-up unit 2 being the origin, the depth z of the image object 33 lighted by the slit light can be expressed by the following equation (4):

Note: Need to insert equation 4

[※2]

In this equation (4), $\theta_1$ represents the projection angle of the patterned light and already determined, and $\theta_2$ is a reflection angle of the patterned light emitted from the image object 33 to the image pick-up device 23. This reflection angle can be given by the following equation (5):

$$\tan \theta_2 = v/f \quad (5)$$

Referring back to the equation (4), d represents the distance between the center of the projector unit 3 and the center of the image pick-up device 23, and f represents focal length of the image pick-up unit 2.

Once z is determined in the equation (4), x and y can also be determined by the following equations (6) and (7):

$$X = (u/f) \times z \quad (6)$$

$$Y = (v/f) \times z \quad (7)$$

Accordingly, the three-dimensional location of the point on the image object 33 can be determined. The same operation is repeated for other points, so that the three-dimensional figure of the image object 33 can be determined.

The image pick-up unit 2 then picks up an image of the image object 33 when the patterned light 32 is not projected on the image object 33, and the picked up image is mapped on the three-dimensional object data determined in the above manner, thereby forming a three-dimensional image. In such a case, either before or after a projection image of the image object 33 is picked up, a non-projection image of the image object 33 is picked up. Alternatively, a divisional image pick-up operation can be performed on the image object 33 so as to measure the three-dimensional configuration of each divisional part. The dimensional data of the divisional images are then-combined so as determine the three-dimensional configuration of the entire image object 33. This image combination process may be executed within the apparatus, or the image information may be transferred to an external apparatus such as a personal computer for image processing. Also, the three-dimensional configuration information determined in this manner may be stored in the memory 28.

As a preliminary image pick-up operation prior to a divisional image pick-up operation, it is also possible to determine the three-dimensional configuration of the entire image pick-up area in the same manner as above (using the stripe-patterned light). By doing so, the image input apparatus can determine in advance whether the image object is a flat object such as a paper sheet or a three-dimensional object, and, at this point, can automatically switch the operation modes between the first operation mode and the second operation mode.

Hereinafter, a second embodiment of the present invention will be described. This embodiment concerns an image input apparatus having the same structure as the image input apparatus 1 of the first embodiment. In the accompanying drawings, like components are denoted by like reference numerals.

In the first embodiment, rays of slit light (i.e., the patterned light 32) are projected, and it is therefore difficult to determine the projection angle $\theta_1$ of each ray of slit light. To ensure precise measurement of the projection angles of rays of slit light, the second embodiment limits the depth of the image object 33 and also limits the movable range of each ray of slit light on an image. By doing so, the movable range of a ray of slit light can be prevented from overlapping with the movable range of the neighboring ray of slit light on either side of the ray. This ensures precise measurement of the projection angle of the ray of slit right. In this case, however, it is necessary to allow a certain distance between each two neighboring rays of slit light, and it is possible that sufficient density cannot be provided for the measurement points for measuring the three-dimensional locations on the image object 33.

FIGS. 10A and 10B illustrate the image object 33 and the patterned light 32 projected onto the image object 33 both seen from the projector unit 3. The measurement is first conducted in a state shown in FIG. 10A, and then in a state where the slits (i.e., the striped pattern) constituting the patterned light 32 are shifted by a half pitch, as shown in FIG. 10B. With the narrower pitch formed by the shifted slits, the number of pick-up images increases, and so does the measuring density. Here, the projector unit 3 may move along with the image pick-up unit 2 or independently of the image pick-up unit 2. In the former case where the projector unit 3 moves along with the image pick-up unit 2, the relative location of the image object 33 with respect to the image pick-up unit 2 also changes. However, as the amount of the movement is predetermined, a correction can be made with the amount of movement of the image object 33. The latter case, where the relative locations of the image pick-up unit 2 and the projector unit 3 are fixed with respect to each other, will be described below in greater detail.

Figure 22:
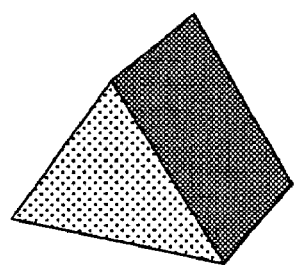
FIG. 22 is a perspective view of a triangular prism as an image object.
Figure 23:
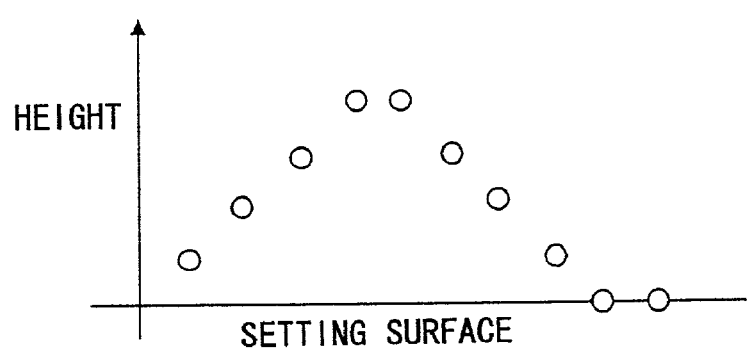
FIG. 23 shows a group of measurement points in a three-dimensional space obtained by picking up an image of the triangular prism of FIG. 22 at an image pick-up location.
Figure 24:
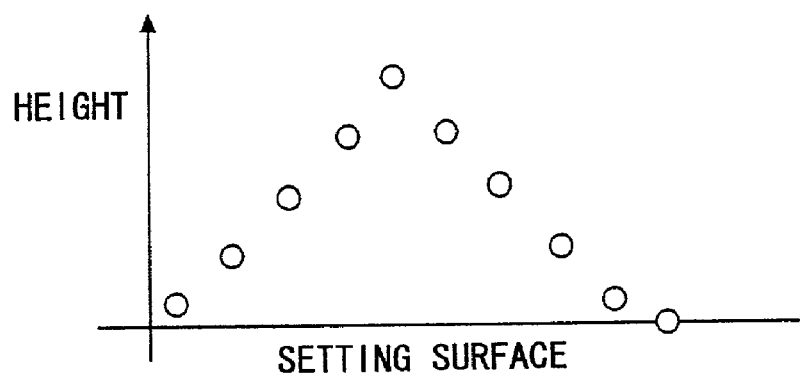
FIG. 24 shows a group of measurement points in a three-dimensional space obtained by picking up an image of the triangular prism of FIG. 22 at another image pick-up location that is slightly shifted from the previous image pick-up location.

When the three-dimensional configuration of a triangular prism shown in FIG. 22 as an image object is to be input, a patterned light is projected in the aforementioned manner. As a result, a group of points in a three-dimensional space are obtained as shown in FIG. 23. The small circles in FIG. 23 represent the respective points, which have been measured. The mover unit 4 then moves the image pick-up unit 2 and the projector unit 3, so that the positional relationship between the image object (the triangular prism) and the projector unit 3 changes. Based on the positional relationship, a group of small circles in a three-dimensional space shown in FIG. 24 are obtained in the same manner as described above. The correlative positional relationship between the first image pick-up location and the second image pick-up location can be expressed by a rotated matrix R and a translational vector T, with the first image pick-up location being the reference location.

For instance, the three-dimensional location of a point obtained at the first image pick-up location can be expressed as follows:

[数3]

Note: Need to insert equation 6

With this three-dimensional location being the reference location, the three-dimensional location of the point obtained by the second image pick-up can be expressed as follows:

[数4]

Note: need to insert equation 7

Figure 25:
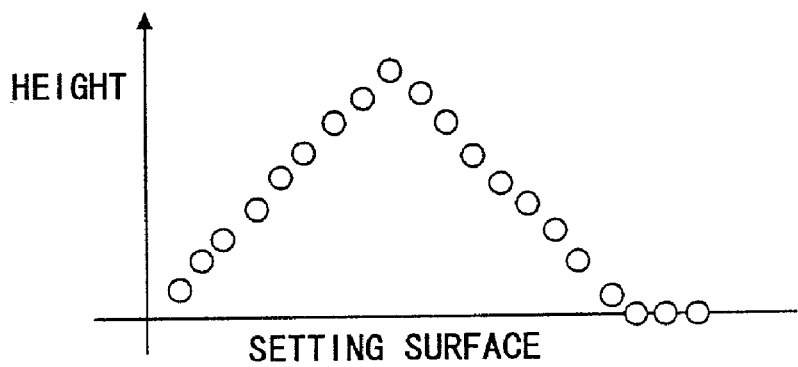
FIG. 25 shows a group of points in the combined location data obtained by combining the location data of both groups of measurement points of FIGS. 23 and 24.

Both of the above three-dimensional location data are then combined into the data shown in FIG. 25. Through this process, the three-dimensional location of the point on the image object is measured with higher precision. Using the measurement data, a polygon is formed, and a texture image is mapped onto each polygon to produce a more precise three-dimensional image.

In this manner, the projector unit 3 is moved by a very short length, and an image onto which a projection light pattern is projected is picked up at both locations before and after the movement of the projector unit 3, thereby increasing the number of three-dimensional location measurement points on the surface of the image object. Accordingly, the three-dimensional locations can be detected with higher precision. The three-dimensional location data are then combined to produce more precise three-dimensional data.

Figure 26:
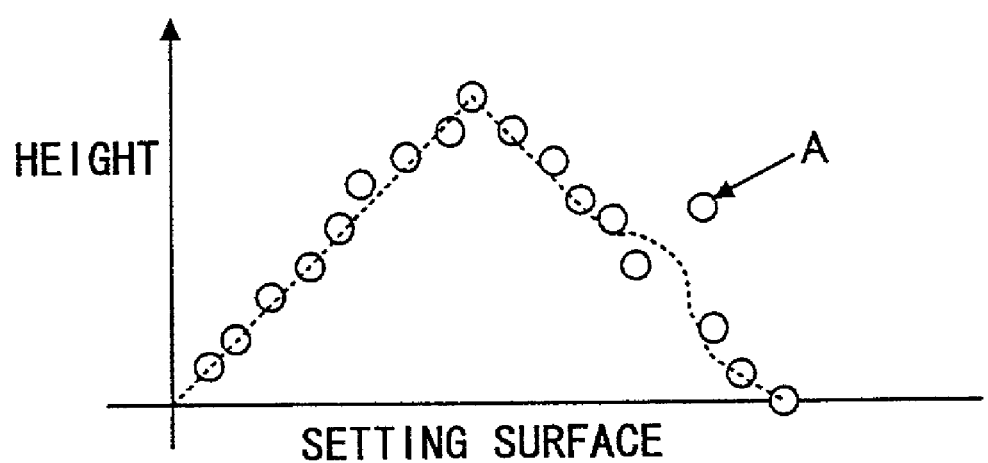
FIG. 26 illustrates a group of points of the combined location data of FIG. 25 containing some measurement errors.

As measurement result of the same image object, the combined three-dimensional location data may become as shown in FIG. 26, for instance. The point A in FIG. 26 represents a point wrongly measured with some measurement errors. With this remaining in the data, a three-dimensional image formed based on the three-dimensional location data results in an unnatural image. It is therefore preferable to eliminate or correct the error.

In order to eliminate or correct such an error, a moving average is determined from the data of measurement points in the vicinity of each measurement point. The broken line in FIG. 26 represents the data obtained from moving average. If the distance between the average value and the original measurement point is greater than a predetermined threshold value, the measurement original measurement point is removed or replaced by the point corresponding to the average value as a new measurement point. In some other case where the distance between two or more points in the vicinity of a measurement point is greater than the predetermined threshold value, the measurement point may removed or, as in the above case, replaced with a new measurement point.

If an error is caused in measurement of the three-dimensional location of a point on the outer surface of an image object due to an external fact such as light from outside, spotting the measurement error with a small number of measurement points is not easy. With the above structure, however, high-density three-dimensional data of the outer surface of an image object can be obtained. Based on the high-density three-dimensional location data, erroneous data (i.e., a wrong measurement point) is identified, and easily removed or corrected. In this manner, it becomes possible to remove noise from a three-dimensional image formed in accordance with the data of wrongly measured points. Thus, a natural image of the image object can be obtained.

Figure 11:
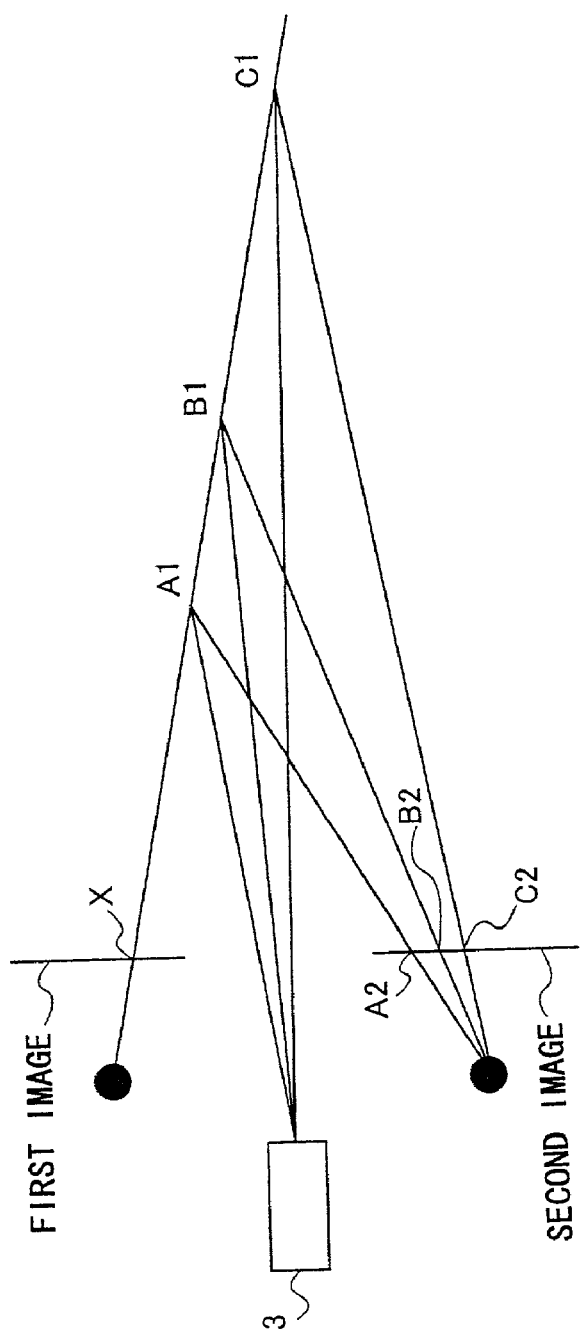
FIG. 11 illustrates the features of a third embodiment of the image input apparatus in accordance with the present invention, by showing candidate locations of a point on the image object when the image pick-up unit is moved.
Figure 12:
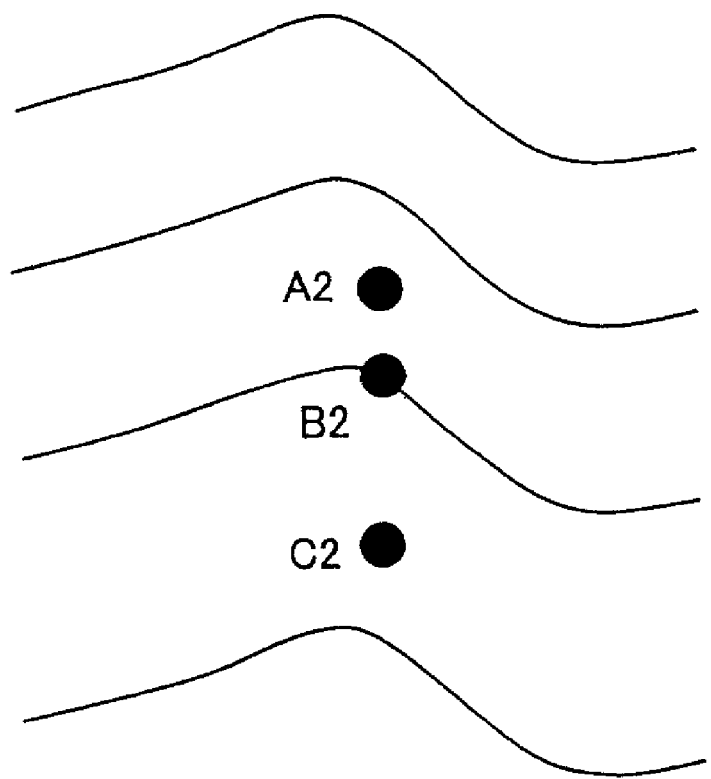
FIG. 12 illustrates the measured locations of the candidate locations on the second image.
Figure 13:
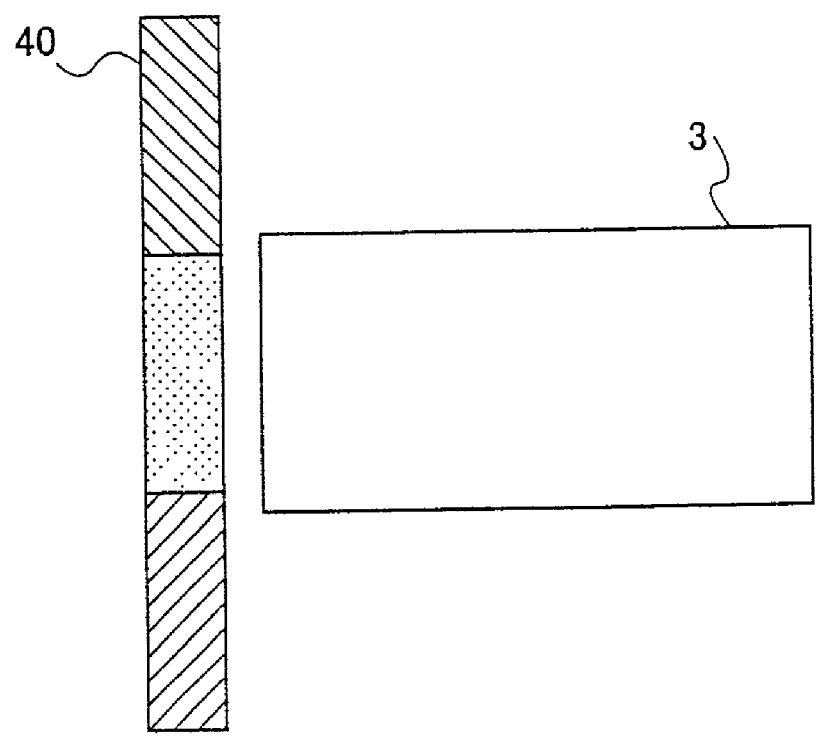
FIG. 13 illustrates a filter for switching light patterns that is applicable to the third embodiment.

FIGS. 11 through 13 illustrate a third embodiment of the image input apparatus in accordance with the present invention. The image input apparatus of this embodiment is the same as the image input apparatus 1 of the first embodiment. In the drawings, like components are denoted by like reference numerals.

FIG. 11 shows the structure of the projector unit 3 of the third embodiment of the image input apparatus in accordance with the present invention.

In FIG. 11, the projector unit 3 is secured to the support unit 5 (shown in FIG. 2), and the measurement of an image is conducted with two images (a first image and a second image) taken by the image pick-up unit 2 at two different image pick-up locations that are slightly shifted from each other. A ray of slit light projected onto the image object from the projector unit 3 is denoted by X on the first image in FIG. 11. Candidate locations A1, B1, and C1 of the image object corresponding to the point X can be calculated. The points corresponding to the candidate locations A1, B1, and C1 on the second image can also be calculated, and-shown as A2, B2, and C2 in FIG. 12. The correct one of the candidate locations of the image object should be at the location of a ray of slit light projected onto the second image. Accordingly, the point B2 is the point on the actual image object in FIG. 12. With these two images, the projection angle of each ray of slit light can be accurately determined. In this manner, a three-dimensional configuration can be measured with sufficient density, without increasing the number of picked up images.

Figure 14:
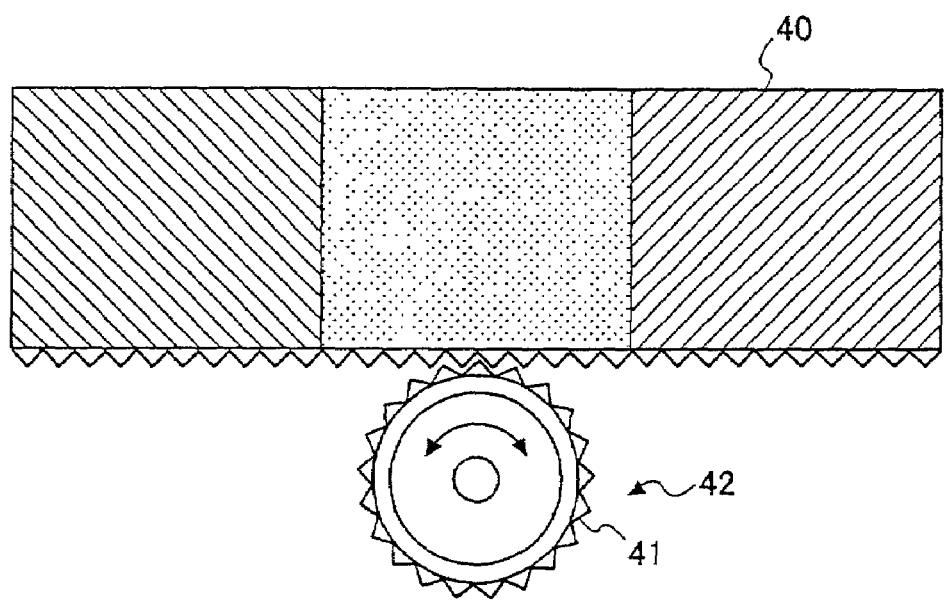
FIG. 14 illustrates a pattern switching mechanism of the filter shown in FIG. 13.

Alternatively, when a three-dimensional configuration is measured, the projector unit 3 may have different projection light patterns for indicating an image pick-up area and for measuring a three-dimensional configuration. Also, the density of patterned light (such as slit light) may be changed depending on a desired resolution in measurement of a three-dimensional configuration. In such a case, a filter 40 having patterns of various types may be employed as shown in FIG. 13. When projection light patterns are to be switched, the patterns on the filter 40 are simply switched. Here, a switching mechanism 42 that switches the patterns on the filter 40 by rotation of a gear 41 may be employed as shown in FIG. 14.

As described before, the image input apparatus 1 of this embodiment performs different image pick-up operations depending on whether a flat object such as a paper sheet or a three-dimensional configuration is to be measured. Also, divisional image pick-up operations and magnifications vary depending on the image pick-up resolution and the size of each image object. In view of this, an operation button for inputting an image pick-up operation mode and a magnification may be employed, and a display unit for displaying the current operation status and availability of operations may also be employed. With these components, the image input apparatus 1 can be more user-friendly.

Figure 15:
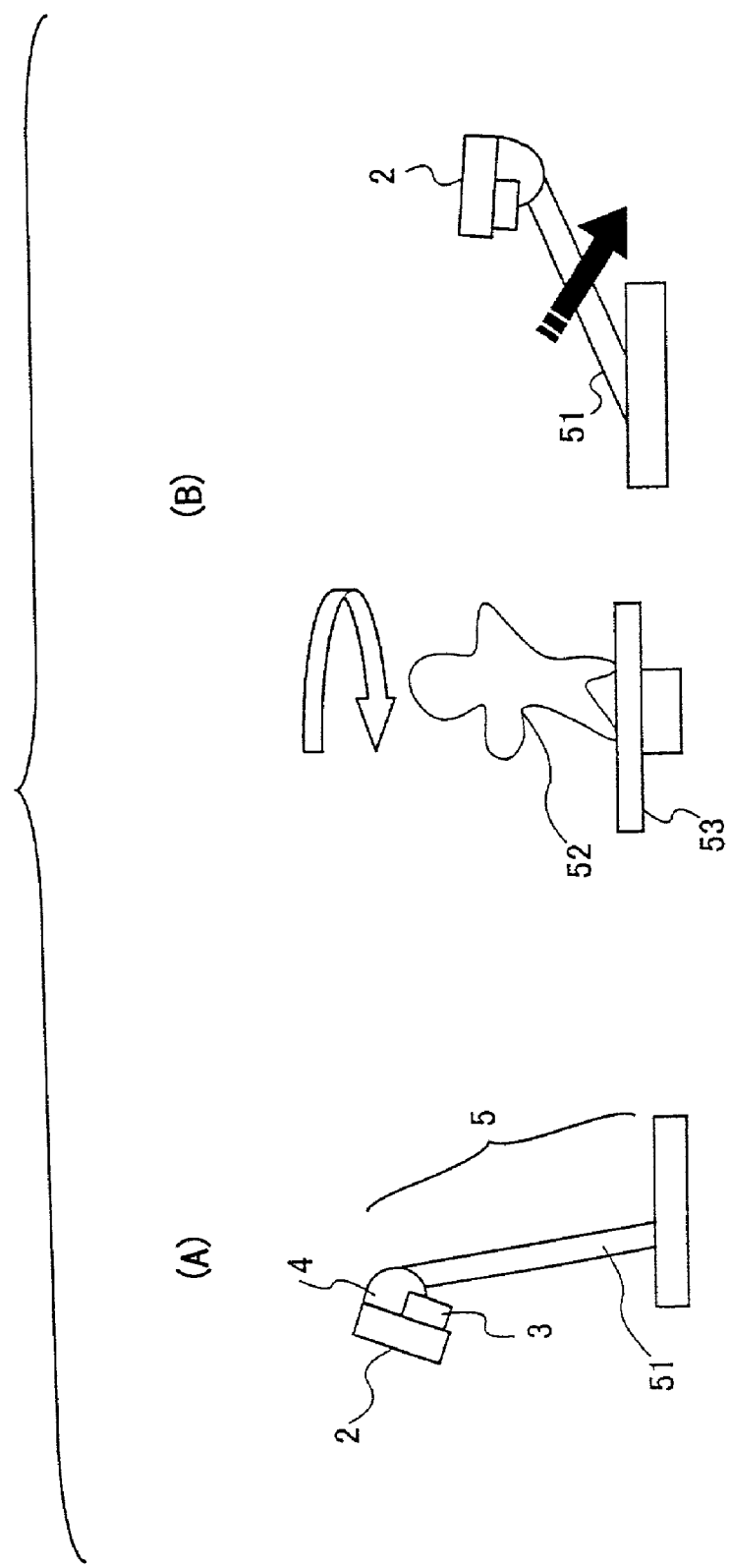
FIGS. 15A and 15B illustrate the structure and functions of a fourth embodiment of the image input apparatus in accordance with the present invention.

FIGS. 15A and 15B illustrate a fourth embodiment of the image input apparatus in accordance with the present invention. The image input apparatus of this embodiment is the same as the image input apparatus 1 of the first embodiment. In the accompanying drawings, like components are denoted by like reference numerals.

When an image of a three-dimensional object is to be formed, it is often desirable to pick up images from various directions so as to form a so-called "3-D image". When images are picked up from above the image object, however, it is troublesome to obtain images from different directions. The fourth embodiment is aimed at solving such a problem.

FIG. 15A is a side view of the image input apparatus in accordance with the present invention. A support pillar 51 that constitutes the support unit 5 is tilted as shown in FIG. 15B, so that the image pick-up unit 2 can perform an image pick-up operation in a horizontal direction. An image object 52 is then placed on a rotating table 53, which rotates automatically or manually, as shown in FIG. 15B. In this manner, images of the image object 52 can be picked up from various directions. The images picked up from various directions are then combined into a 3-D image that can be seen from every direction.

Figure 16:
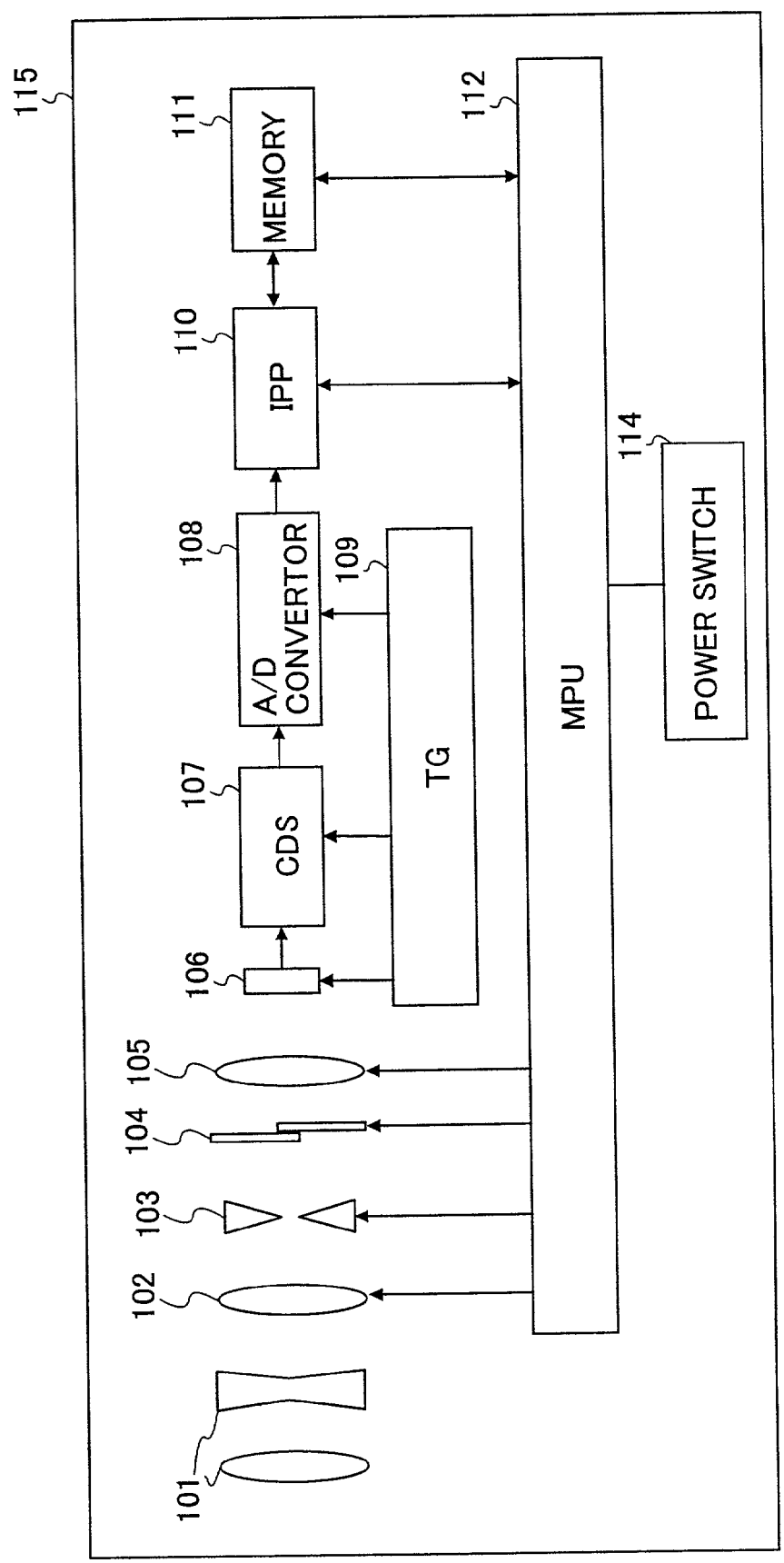
FIG. 16 is an internal block diagram of the image pick-up unit of a fifth embodiment of the image input apparatus in accordance with the present invention.
Figure 17:
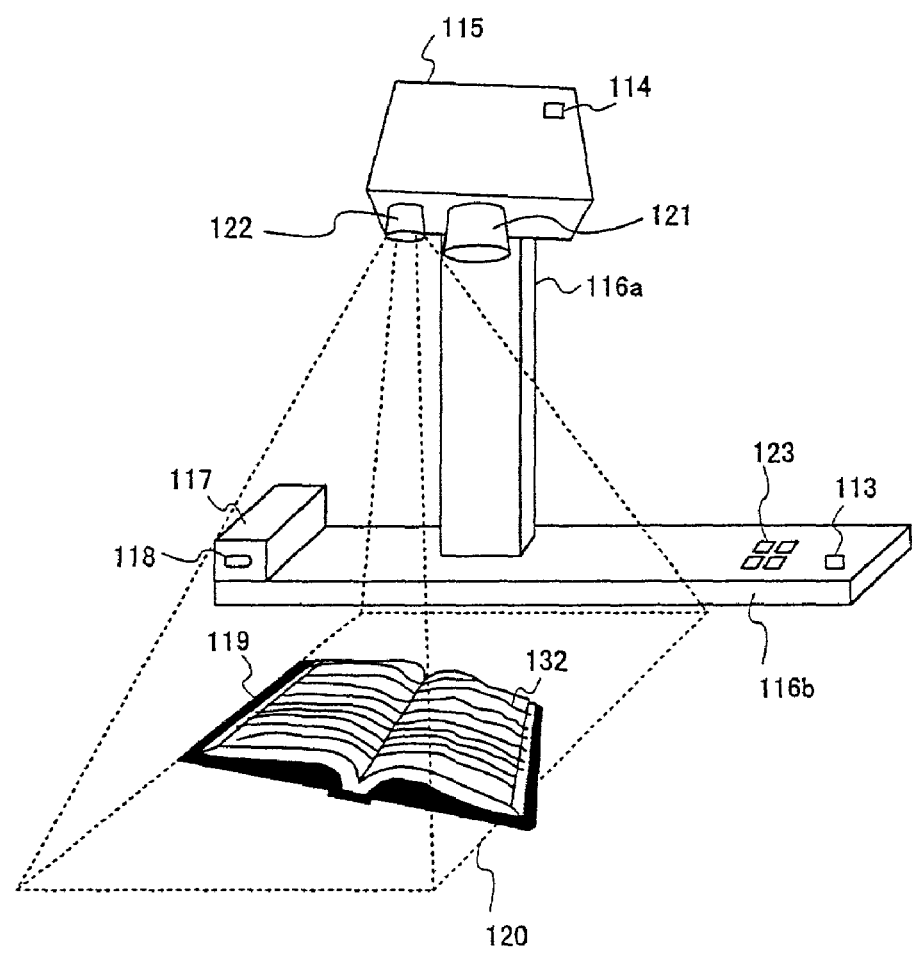
FIG. 17 is a perspective view of the entire structure and functions of the fifth embodiment of the present invention.

FIGS. 16 and 17 illustrate a fifth embodiment of the present invention. The image input apparatus of the fifth embodiment includes an image pick-up unit 115, a power switch 114 set in the image pick-up unit 115, an image pick-up lens 121, a patterned light projector unit 122 for projecting a predetermined patterned light for measuring a three-dimensional configuration, a support pillar 116a for supporting the image pick-up unit 115, a support unit 116b for securing the support pillar 116a, a control unit 117 set on the support unit 116b, an input instruction switch 113 set on the support unit 116b, and an image pick-up operation mode setting switch 123 for setting an image pick-up operation mode.

The control unit 117 includes a MPU(Microprocessing Unit) 112, a memory 111 such as a hard disk and a semiconductor memory, and an interface 118. The control unit 117 controls the operations of the image pick-up unit 115. Image data transferred from the image pick-up unit 115 is subjected to image processing by the control unit 117, which also edits and records the image data. The control unit 117 is connected to an external device via the interface 118, and communicates with the external device. The interface 118 may be a general-purpose interface for personal computers, such as RS-232C, USB(Universal Serial Bus), IEEE1394, a network adapter, and IrDA(infrared Data Association).

In FIG. 16, an image of an image object 119 is sent through a fixed lens 101, a zoom lens 102 (the image pick-up lens in the foregoing embodiments) a diaphragm mechanism 103, and a focus lens 105, with a shutter 104 controlling the exposure time. The image is then formed on an image pick-up device 106. An image signal generated from the image pick-up device 106 is sampled by a CDS(Correlated Double Sampling) circuit 107, and is then converted into a digital signal by an A/D converter 108. Here, the timing is generated by a timing generator (TG) 109. The image signal is further subjected to image processing such as aperture correction and compression by an image pre-processor (IPP) 110. The processed image signal is finally stored in the memory 111. The operation of each unit is controlled by the MPU 112. The recording of the image can be commanded by pressing the input instruction switch 113 on the support unit 116b.

Figure 18:
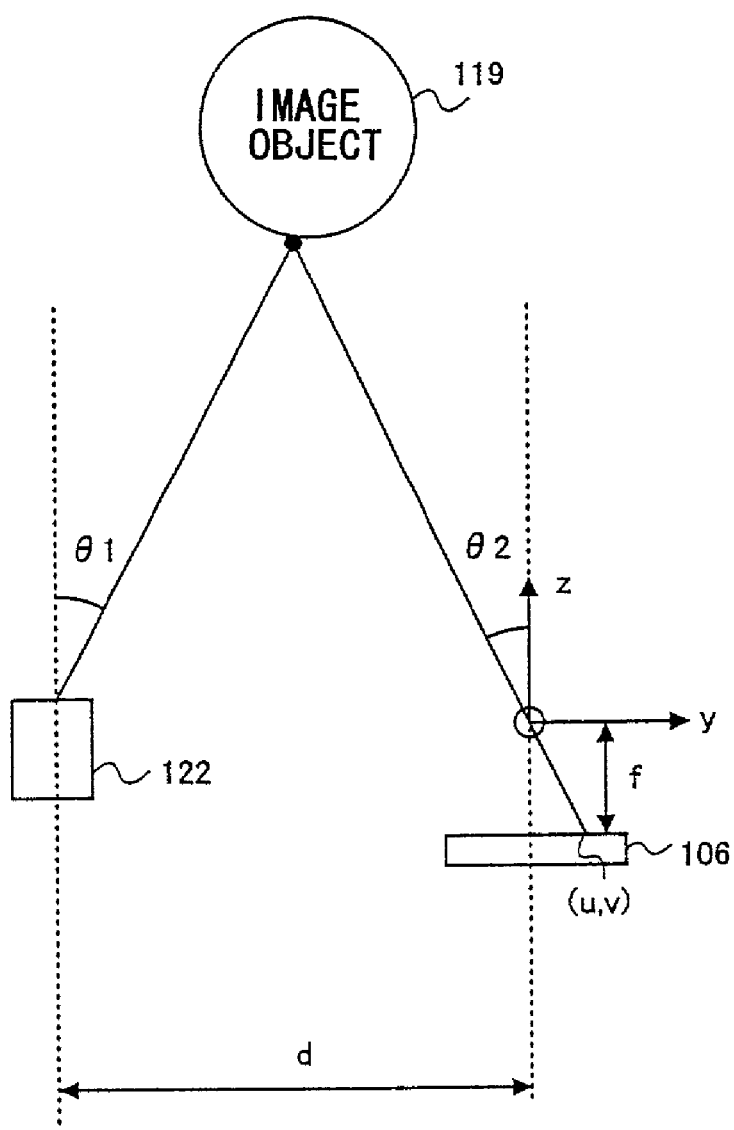
FIG. 18 illustrates the principles of three-dimensional configuration measurement in the fifth embodiment of the present invention.

The image pick-up unit 115 picks up distortions of a light pattern projected onto the image object 119 from the patterned light projector 122, thereby measuring the three-dimensional configuration. The calculation of the three-dimensional configuration is conducted in accordance with the trigonometrical survey principles shown in FIG. 18. More specifically, an image of a point on the image object 119 onto which a ray of slit light (patterned light) is projected from the patterned light projector unit 122 is formed at a point (u, v) on the image pick-up device 106. When the coordinate system is defined with the optical center of the optical system of the image pick-up unit 115 being the origin, the depth of each point on the image object 119 onto which a ray of slit light is projected can be expressed by the equation (4) shown earlier in the description of the present invention.

Here, $\theta_1$ represents the projection angle of the ray, and $\theta 2$ can be expressed by the equation (5) also shown earlier in the description of the present invention. In the equation (5), f represents the focal length of the optical system of the image pickup unit 115.

Once the value of z is determined, x and y can also be determined by the equations (6) and (7), which are also shown earlier in the description of the present invention.

In the above manner, the three-dimensional location of one point on the image object 119. The same process is repeated for other points on the image object 119, so that the three-dimensional configuration of the image object 119 can be determined.

Figure 19:
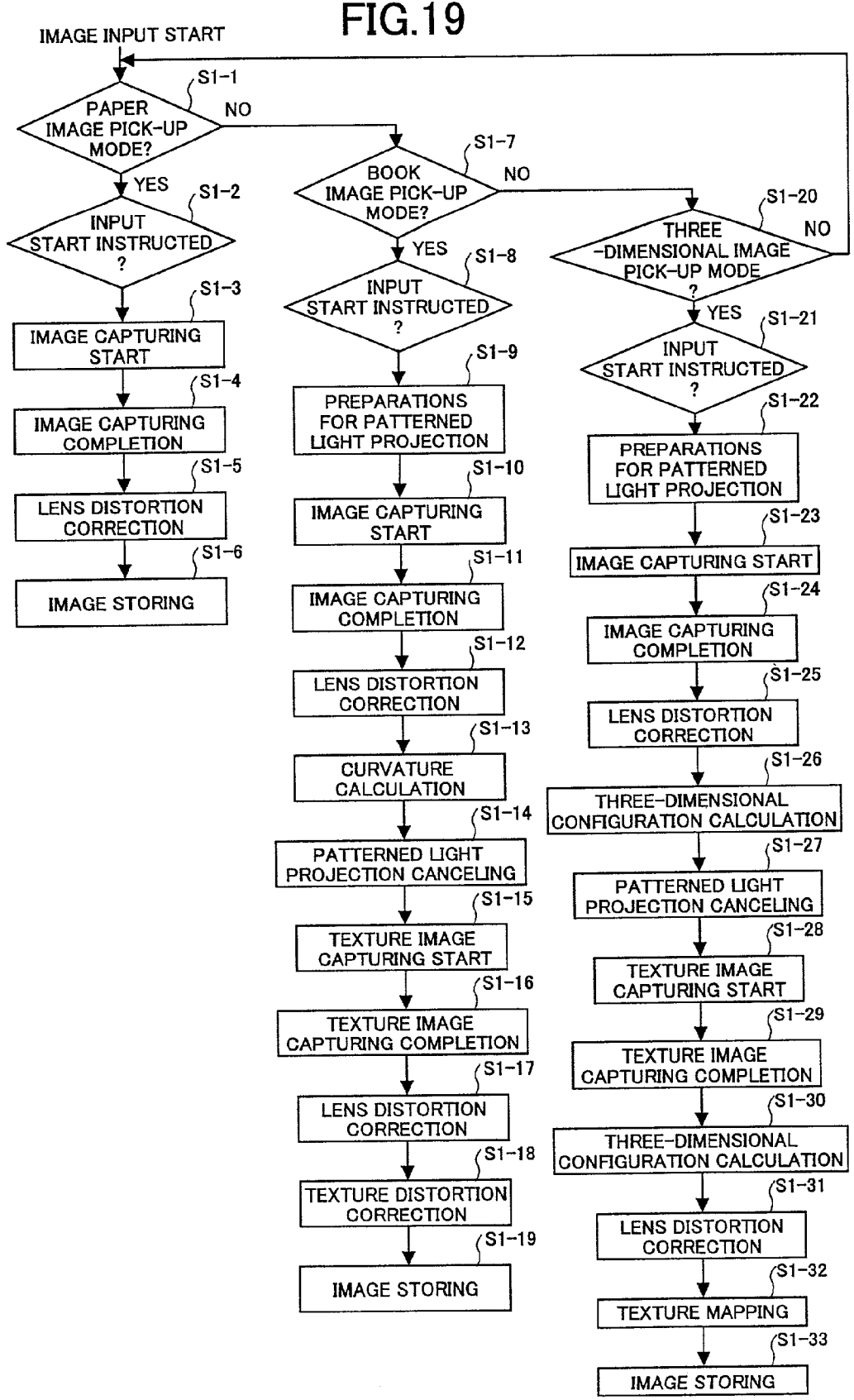
FIG. 19 is a flowchart of operations performed in the fifth embodiment of the present invention.

In the fifth embodiment, an image pick-up operation mode can be set in the image pick-up unit 115 by pressing the image pick-up operation mode setting switch 123 for selecting from the three modes consisting of a paper image pick-up operation mode, a book image pick-up operation mode, and a three-dimensional image pick-up operation mode. The image pick-up unit 115 performs an image pick-up operation in accordance with the mode setting. The operations of the image pick-up unit will be described below, with reference to an operation flowchart of FIG. 19.

When an image of a paper sheet is to be picked up, the paper image pick-up operation mode is selected in step S1-1. After an inputting operation is commanded in S1-2, an image capturing process is started in step S1-3. In step S1-4, a predetermined image pick-up operation is performed, and the image capturing process is completed. In step S1-5, the captured image is subjected to lens distortion correction. In step S1-6, the obtained image information is stored in the memory 111. Back in step S1-5, not only the lens distortion correction, but also a general digital image processing operation, such as shade correction, 2-digit processing, and skew correction, may be carried out. In the paper image pick-up operation mode, an image pick-up operation is performed by the image pick-up unit 115, but no three-dimensional measurement using the patterned light projector unit 122 is conducted.

When an image of a book is to be picked up, the book image pick-up operation mode is selected in step S1-7. After an inputting operation is commanded in step S1-8, preparations such as recharging of a light source capacitor (not shown) are made for projecting patterned light (such as slit light) in step S1-9. An image capturing process using patterned light projection by the patterned light projector unit 122 is started in step S1-10, and is completed in step S1-11. In accordance with the location information of the patterned light in the obtained image, the three-dimensional configuration of the image object is calculated so as to determine the curvature of the book in step S1-13.

The light projection mode for projecting patterned light from the patterned light projector unit 122 is cancelled in step S1-15. A capturing process of a texture image (an image of the actual image object) is started in step S1-15, and is completed in step S1-16. The obtained image information is subjected to lens distortion correction in step S1-17. Based on the curvature calculation result of step S1-13, distortions in the texture image are corrected in step S1-18. The texture image is then projected onto a flat surface, and the result is stored in step S1-19.

When an image of a three-dimensional object is to be picked up, the three-dimensional image pickup operation mode is selected in step S1-20. Thereafter, the same processes as in the book image pick-up operation mode are repeated until between the lens distortion correction of steps S1-25 and S1-31. Based on the location information of the patterned light obtained with the patterned light projector 122, the three-dimensional configuration of the image object is calculated in step S1-26. The texture image captured in steps S1-28 and S1-29 is then mapped on the three-dimensional configuration in step S1-30, thereby producing image data containing three-dimensional information. The image data is converted into a language such as VRML(Virtual Reality Modeling Language), and is finally stored.

Figure 20:
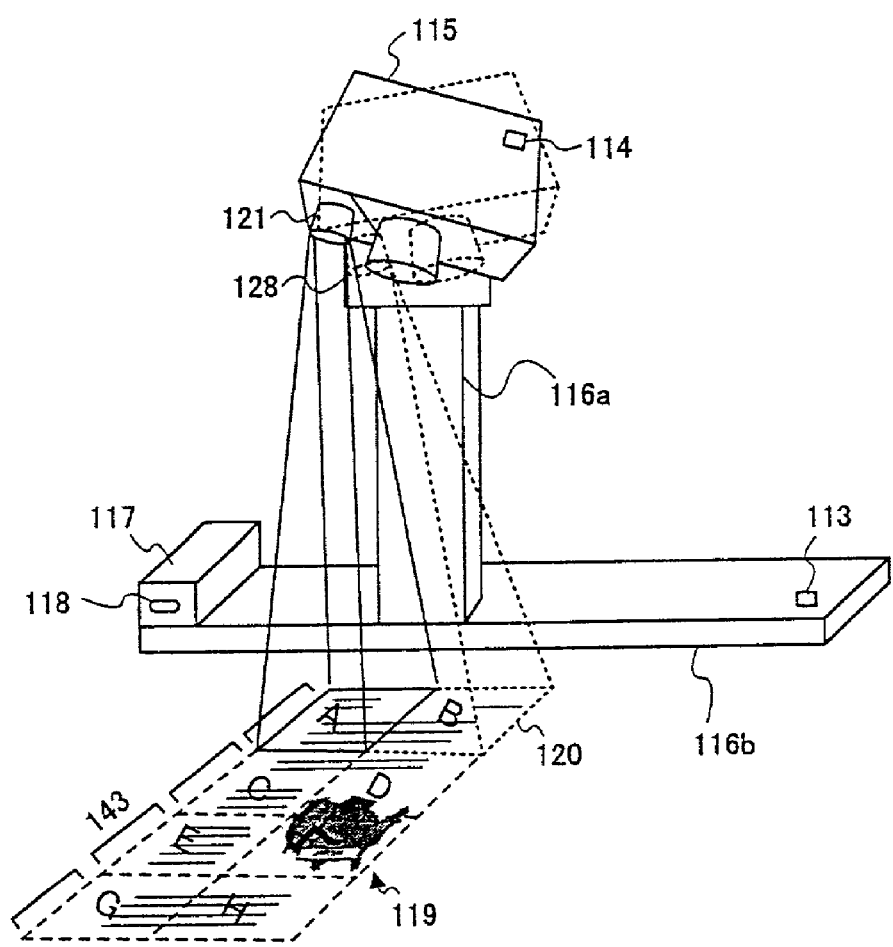
FIG. 20 is a perspective view of the entire structure and functions of a sixth embodiment of the image input apparatus in accordance with the present invention.

Referring now to FIG. 20, a sixth embodiment of the present invention will be described below.

In the sixth embodiment, in addition to the three image pick-up operation modes consisting of the paper image pick-up operation mode, the book image pick-up operation mode, and the three-dimensional image pick-up operation mode, a resolution for image pick-up can also be selected and set in the image input apparatus. The other features of this embodiment are the same as those of the fifth embodiment. In the drawings, therefore, like components are denoted by like reference numerals.

The setting of an image pick-up resolution is conducted as the setting of a digital image processing operation of the IPP 110 of the image pick-up unit 115. As shown in FIG. 20, a drive unit 128 is added as a driving means for shifting direction of the image pick-up unit 115. Furthermore, a unit for controlling the zooming of the zoom lens 102 is employed, with the MPU 112 serving as hardware. With these additions, the visual center and the angle of view of the image pick-up unit 115 can be changed. The image object 119 is recorded as a plurality of divisional images, which are combined into one image by an image combining unit (constituted by the MPU 112). An image pick-up resolution can be freely adjusted in this structure. The drive unit 128 may be formed by two stepping motors, with the rotational axes crossed at right angle with respect to each other, and gears having a predetermined damping ratio. With the above components, an image pick-up resolution can be suitably adjusted in each image pick-up operation mode.

Figure 21:
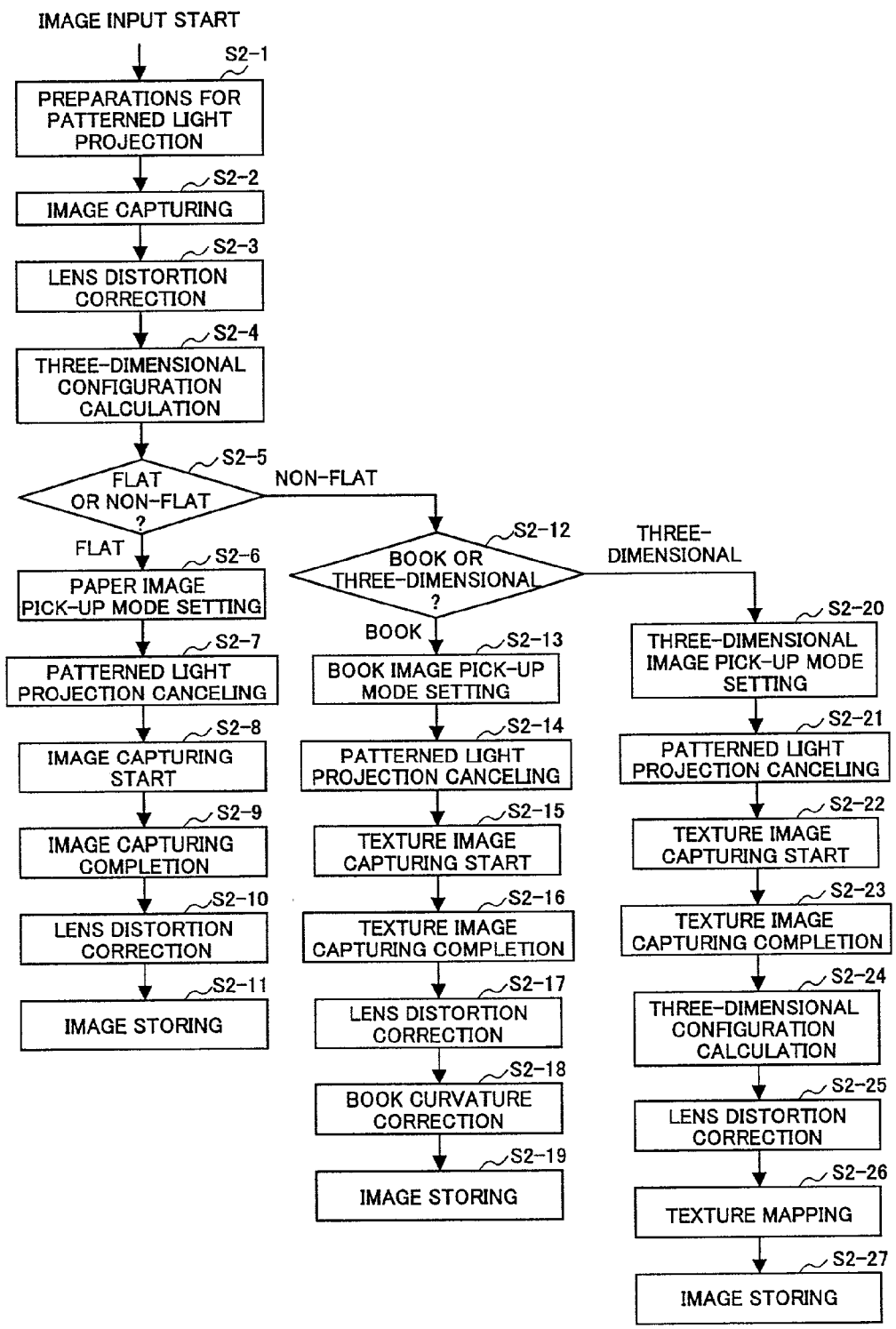
FIG. 21 is a flowchart of operations performed in a seventh embodiment of the image input apparatus in accordance with the present invention.

Referring now to FIG. 21, a seventh embodiment of the present invention will be described below.

The image input apparatus of this embodiment further includes an automatic selecting unit that automatically recognizes the type of an image object, with the MPU 112 serving as hardware. The other features of this embodiment are the same as those of the fifth embodiment.

FIG. 21 is a flowchart of operations performed by the image input apparatus of the seventh embodiment including the automatic selecting unit.

When an image inputting operation is started, preparations are made for projecting patterned light from the patterned light projector unit 122, which is step S2-1. In step S2-2, an image capturing process using the patterned light projector unit 122 is carried out. In step S2-3, the obtained image information is subjected to image processing such as lens distortion correction. In step S2-4, the three-dimensional configuration of the image object is calculated in the aforementioned manner. Based on the calculation result, one of the image pick-up operation modes is automatically selected.

In step S2-5, it is first determined whether the image object is a flat object. The determination is made by comparing the result of the three-dimensional configuration calculation with a threshold value determined from a statistic such as an average value of predetermined one-dimensional form values (distance values). If the calculation result is smaller than the threshold value (or near the value obtained by measuring the predetermined flat surface), the image object is determined to be a flat object. If the calculation result is greater than the threshold value, the image object is determined to be a non-flat object. Where the image object is a flat object, a series of processes of steps S2-6 through S2-11 are carried out in the paper image pick-up operation mode. Where the image object is a non-flat object, it is determined whether the image object is a book or a three-dimensional object in step S2-12.

A book is normally a double-page spread document. The configuration of a double-page spread document invariably has a certain curvature in the vertical direction. Also, a book normally has an almost constant height in the horizontal direction. In view of these facts, the location of a book is determined by detecting the edge between the book and the background. A skew correcting process is then performed using the detected location data of the book. The document image information is then corrected so that the document always stays within the image pick-up area and properly faces in a predetermined direction. Here, the three-dimensional configuration of the document can be determined fairly accurately. The corrected data is stored as representative values Template matching with the representative values is then carried out to determine whether the image object is a book.

Where the image object is determined to be a book, a series of processes of step S2-13 through S2-19 are carried out in the book image pick-up operation mode. Where the image object is determined to be a three-dimensional object, a series of processes of S2-20 through S2-27 are carried out in the three-dimensional image pick-up operation mode.

It should be noted that the present invention is not limited to the embodiments specifically disclosed above, but other variations and modifications may be made without departing from the scope of the present invention.

What is claimed is:

1. An image input apparatus comprising:
   a projector unit configured to project image pick-up light onto an image object;
   an image pick-up unit configured to pick up an image of the image object;
   a support unit configured to support the image pick-up unit; and
   a mover unit configured to move the image pick-up unit relatively with the support unit,
   wherein the projector unit projects a projection light pattern onto the image object,
   the image pick-up unit picks up a projection image containing a visual angle distortion of the projection light pattern,
   the relative position between the projector unit and the image pick-up unit is fixed, and
   the mover unit causes relative movement of the image pick-up unit so as to pick up a plurality of projection images at different image pick-up locations.

2. The image input apparatus as claimed in claim 1, wherein
   the relative position between the projector unit and the support unit is fixed, and
   the mover unit moves the image pick-up unit so that the image pick-up unit picks up the plurality of projection images at different image pick-up locations.

3. The image input apparatus as claimed in claim 1, wherein the image pick-up unit picks up a non-projection image formed when the projector unit does not project light onto the image object.

4. The image input apparatus as claimed in claim 1, further comprising a location memory unit configured to store location data of the image pick-up unit when an image is picked up by the image pick-up unit,
   wherein a visual angle distortion of the image picked up by the image pick-up unit is corrected in accordance with the location data stored in the location memory unit.

5. The image input apparatus as claimed in claim 1, further comprising a switch unit configured to switch an image pick-up mode between a first operation mode for picking up a flat image and a second operation mode for picking up a three-dimensional image.

6. The image input apparatus as claimed in claim 5, wherein,
   in the first operation mode, the image pick-up unit performs an image pick-up operation without light projection from the projector unit, and
   in the second operation mode, the projector unit projects the projection light pattern onto the image object, so that the image pick-up unit picks up the projection image containing a visual angle distortion of the projection light pattern.

7. The image input apparatus as claimed in claim 5, wherein, in the second operation mode, before or after the image pick-up unit picks up the projection image, the image pick-up unit picks up a non-projection image formed when the projector unit does not project light onto the image object.

8. The image input apparatus as claimed in claim 1, wherein the image pick-up unit performs a preliminary image pick-up operation on an image pick-up area.

9. The image input apparatus as claimed in claim 1, wherein the projector unit projects a projection light pattern for indicating an image pick-up area before the image pick-up unit performs an image pick-up operation on the image object.

10. The image input apparatus as claimed in claim 1, further comprising a three-dimensional configuration measurement unit configured to measure a three-dimensional configuration of an image object in accordance with an image picked up by the image pick-up unit.

11. The image input apparatus as claimed in claim 10, further comprising a three-dimensional image forming unit configured to form a three-dimensional image in accordance with the image picked up by the image pick-up unit and the three-dimensional configuration of the image object obtained by the three-dimensional configuration measuring unit.

12. The image input apparatus as claimed in claim 1, further comprising a visual angle distortion correcting unit configured to correct a visual angle distortion of each picked up image.

13. The image input apparatus as claimed in claim 1, wherein the support unit is rotatable.

14. An image input apparatus as claimed in claim 1, further comprising:
a three-dimensional configuration measuring unit configured to measure a three-dimensional image object,
which apparatus has three image pick-up modes consisting of:
a paper image pick-up mode for picking up an image of a flat object such as paper;
a book image pick-up mode for picking up an image of a double-page spread object such as an opened book; and
a three-dimensional image pick-up mode for picking up an image of a three-dimensional object.

15. The image input apparatus as claimed in claim 14, wherein the image pick-up unit has a plurality of image pick-up resolution settings corresponding to the image pick-up modes.

16. The image input apparatus as claimed in claim 14, further comprising:
an image object determining unit configured to determine characteristic features of the image object in accordance with a measurement result obtained by the three-dimensional configuration measuring unit; and
an automatic mode select unit configured to automatically select one of the three image pick-up modes in accordance with a determined result from the image object determining unit.

17. An image input apparatus comprising:
a projector unit configured to project image pick-up light onto an image object;
an image pick-up unit configured to pick up an image of the image object;
a support unit configured to support the image pick-up unit; and
a mover unit configured to move the image pick-up unit relatively with the support unit,
wherein the projector unit projects a projection light pattern onto the image object,
the image pick-up unit picks up a projection image containing a visual angle distortion of the projection light pattern, and
the mover unit moves the image pick-up unit by a very small distance, so that the image pick-up unit picks up a plurality of projection images in image pick-up positions that are only slightly shifted from one another.

18. The image input apparatus as claimed in claim 17, further comprising a composition unit configured to combine three-dimensional configuration data obtained in accordance with the plurality of projection images so as to generate combined three-dimensional configuration data.

19. An image input method comprising:
projecting image pickup light onto an image object using a projector unit;
picking up an image of the image object using an image pick-up unit;
supporting the image pick-up unit using a support unit; and
moving the image pick-up unit relatively with the support unit using a mover unit,
wherein the projector unit projects a projection light pattern onto the image object, the image pick-up unit picks up a projection image containing a visual angle distortion of the projection light pattern, the relative position between the projector unit and the image pick-up unit is fixed, and the mover unit causes relative movement of the image pick-up unit so as to pick up a plurality of projection images at different image pick-up locations.

20. The image input method as claimed in claim 19, wherein the relative position between the projector unit and the support unit is fixed, and the mover unit moves the image pick-up unit so that the image pick-up unit picks up the plurality of projection images at different image pick-up locations.

21. The image input method as claimed in claim 19, wherein the image pick-up unit picks up a non-projection image formed when the projector unit does not project light onto the image object.

22. The image input method as claimed in claim 19, further comprising storing location data of the image pick-up unit in a location memory unit when an image is picked up by the image pick-up unit, wherein a visual angle distortion of the image picked up by the image pick-up unit is corrected in accordance with the location data stored in the location memory unit.

23. The image input method as claimed in claim 19, further comprising switching an image pick-up mode between a first operation mode for picking up a flat image and a second operation mode for picking up a three-dimensional image, using a switch unit.

24. The image input method as claimed in claim 23, wherein, in the first operation mode, the image pickup unit performs an image pickup operation without light projection from the projector unit, and in the second operation mode, the projector unit projects the predetermine projection light pattern onto the image object, so at the mage pick-up unit picks up the projection image containing a visual angle distortion of the projection light pattern.

25. The image input method as claimed in claim 23, wherein, in the second operation mode, before or after the image pick-up unit picks up the projection image, the image pick-up unit picks up a non-projection image formed when the projector unit does not project light onto the image object.

26. The image, input method as claimed in claim 19, wherein the image pick-up unit performs a preliminary image pick-up operation on an image pickup area.

27. The image input method as claimed in claim 19, wherein the projector unit projects a projection light pattern for indicating an image pick-up area before the image pick-up unit performs an image pick-up operation on the image object.

28. The image input method as claimed in claim 19, further comprising measuring a three-dimensional configuration of an image object in accordance with an image picked up by the image pickup unit, using a three-dimensional configuration measurement unit.

29. The image input method as claimed in claim 28, further comprising forming a three-dimensional image in accordance with the image picked up by the image pick-up unit and the three-dimensional configuration of the image object obtained by the three-dimensional configuration measuring unit, using a three-dimensional image forming unit.

30. The image input method as claimed in claim 19, further comprising correcting a visual angle distortion of each picked up image, using a visual angle distortion correcting unit.

31. The image input method as claimed in claim 19, wherein the support unit is rotatable.

32. An image input method as claimed in claim 19, further comprising:
measuring a three-dimensional image object using a three-dimensional configuration measuring unit, which method operates in three image pick-up modes consisting of:
a paper image pick-up mode for picking up an image of a flat object such as paper;
a book image pick-up mode for picking up an image of a double-page spread object such as an opened book; and
a three-dimensional image pick-up mode for picking up an image of a three-dimensional object.

33. The image input method as claimed in claim 32, wherein the image pick-up unit has a plurality of image pick-up resolution settings corresponding to the image pick-up modes.

34. The image input method as claimed in claim 32, further comprising:
determining characteristic features of the image object in accordance with a measurement result obtained by the three-dimensional configuration measuring unit, using an image object determining unit; and
automatically selecting one of the three image pickup modes in accordance with a determined result from the image object determining unit, using an automatic mode select unit.

35. An image input method comprising:
projecting image pickup light onto an image object using a projector unit;
picking up an image of the image object using an image pick-up unit;
supporting the image pick-up unit using a support unit; and
moving the image pick-up unit relatively with the support unit using a mover unit, wherein the projector unit projects a projection light pattern onto the image object, the image pick-up unit picks up a projection image containing a visual angle distortion of the projection light pattern, and the mover unit moves the image pick-up unit by a very small distance, so that the image pick-up unit picks up a plurality of projection images in image pick-up positions that are only slightly shifted from one another.

36. The image input method as claimed in claim 35, further comprising combining three-dimensional configuration data obtained in accordance with the plurality of projection images so as to generate combined three-dimensional configuration data, using a composition unit.

37. An image input apparatus comprising:
means for projecting image pickup light onto an image object;
means for picking up an image of the image object;
means for supporting the means for picking up an image; and
means for moving the means for picking up an image relatively with the means for supporting,
wherein the means for projecting projects a projection light pattern onto the image object, the means for picking up an image picks up a projection image containing a visual angle distortion of the projection light pattern, the relative position between the means for projecting and the means for picking up an image is fixed, and the means for moving causes relative movement of the means for picking up an image so as to pick up a plurality of projection images at different image pick-up locations.

* * * * *